(12) United States Patent
Chen et al.

(10) Patent No.: US 9,047,666 B2
(45) Date of Patent: Jun. 2, 2015

(54) IMAGE REGISTRATION AND FOCUS STACKING ON MOBILE PLATFORMS

(71) Applicant: Futurewei Technologies, Inc., Plano, TX (US)

(72) Inventors: Lulin Chen, San Jose, CA (US); Meng Liu, San Diego, CA (US); Xudong Song, Pleasanton, CA (US)

(73) Assignee: Futurewei Technologies, Inc., Plano, TX (US)

( * ) Notice: Subject to any disclaimer, the term of this patent is extended or adjusted under 35 U.S.C. 154(b) by 165 days.

(21) Appl. No.: 13/795,249

(22) Filed: Mar. 12, 2013

(65) Prior Publication Data

US 2014/0267833 A1    Sep. 18, 2014

(51) Int. Cl.
G06K 9/00    (2006.01)
G06T 5/00    (2006.01)
G06T 5/50    (2006.01)

(52) U.S. Cl.
CPC . *G06T 5/003* (2013.01); *G06T 5/50* (2013.01); *G06T 2207/10016* (2013.01); *G06T 2207/20016* (2013.01); *G06T 2207/20064* (2013.01)

(58) Field of Classification Search
CPC .. G06K 9/527; G06K 9/96202; G06T 3/4038; G06T 3/0081; G06T 5/002; G06T 5/003; G06T 5/006; G06T 5/20; G06T 5/50; G06T 7/0022; G06T 7/0024; G06T 7/0028; G06T 7/0034; G06T 7/004; G06T 7/0065; G06T 7/0075; G06T 7/0081; G06T 7/0085; G06T 7/0091; G06T 7/0095; G06T 7/0097; G06T 11/60; G06T 2207/10012; G06T 2207/20064; H04N 1/0037; H04N 5/232; H04N 5/32232; H04N 5/23238; H04N 5/23254; H04N 5/2625; H04N 5/23267; H04N 5/23255; H04N 5/23256; H04N 5/238; H04N 5/3454; H04N 5/3532; H04N 5/272; H04N 13/0022; H04N 13/02; H04N 13/0203; H04N 13/0239; H04N 13/0242; H04N 13/025; H04N 2013/0081; H04N 2013/0088; G09G 5/14; G09G 2340/10; G03B 5/00; G03B 37/00; G03B 37/04; G01C 11/00
See application file for complete search history.

(56) References Cited

U.S. PATENT DOCUMENTS 8,274,552 B2 * 9/2012 Dahi et al. ............... 348/47
8,441,520 B2 * 5/2013 Dahi et al. ............... 348/47
(Continued)

FOREIGN PATENT DOCUMENTS

CN    101968883 A    2/2011
CN    102609931 A    7/2012

OTHER PUBLICATIONS

Zitova, B., et al., "Image Registration Methods: a Survey," Image and Vision Computing 21, Elsevier B.V., 2003, pp. 977-1000.

(Continued)

*Primary Examiner* — Jose Couso
(74) *Attorney, Agent, or Firm* — Conley Rose, P.C.; Grant Rodolph; William H. Dietrich

(57) ABSTRACT

A mobile device comprising a processor configured to merge a plurality of images each having a distinct focus position in a scene to generate a focus-stacked image that encompasses all focus positions of the plurality of images. Also, an apparatus comprising a camera configured to capture a plurality of color images for one scene each with a distinct focus distance and a processor configured to register the plurality of color images to generate a plurality of registered color images, generate a plurality of luminance (Y) channels from the plurality of registered color images, and stack the plurality of Y channels to generate a focus-stacked Y channel.

33 Claims, 11 Drawing Sheets

(56) References Cited

U.S. PATENT DOCUMENTS

| | | | |
|---|---|---|---|
| 8,515,171 B2* | 8/2013 | Vantaram et al. | 382/173 |
| 8,587,681 B2* | 11/2013 | Guidash | 348/218.1 |
| 2008/0079839 A1 | 4/2008 | Sung et al. | |
| 2011/0169985 A1* | 7/2011 | Cooper | 348/241 |
| 2013/0010067 A1 | 1/2013 | Veeraraghavan et al. | |
| 2013/0135445 A1* | 5/2013 | Dahi et al. | 348/47 |

OTHER PUBLICATIONS

Partial English Translation and Abstract of Chinese Patent Application No. CN102609931A, Aug. 27, 2014, 5 pages.

Foreign Communication From a Counterpart Application, PCT Application No. PCT/CN2014/073288, International Search Report dated Jun. 18, 2014, 7 pages.

Foreign Communication From a Counterpart Application, PCT Application No. PCT/CN2014/073288, Written Opinion dated Jun. 18, 2014, 5 pages.

Burt, P., et al., "Enhanced Image Capture Through Fusion," Fourth International Conference on Computer Vision, May 11-14, 1993, pp. 173-182.

Li, S., et al., "Fusing Images with Different Focuses Using Support Vector Machines," IEEE Transactions on Neural Networks, vol. 15, No. 6, Nov. 2004, pp. 1555-1561.

Szeliski, R., et al., "Image Alignment and Stitching: A Tutorial," NOW The Essence of Knowledge, Foundations and Trends in Computer Graphics and Vision, vol. 2, No. 1, Jan. 2006, 105 pages.

Aguet, F., et al., "Model-Based 2.5-D Deconvolution for Extended Depth of Field in Brightfield Microscopy," IEEE Transactions on Image Processing, vol. 17, No. 7, Jul. 2008, pp. 1144-1153.

Gabarda, S., et al., "On the use of a Joint Spatial-Frequency Representation for the Fusion of Multi-Focus Images," Elsevier, Science Direct, 2005, 7 pages.

Vanderbrug, G., et al., "Two-Stage Template Matching," IEEE Transactions on Computers, vol. C-26, No. 4, Apr. 1977, pp. 384-393.

"Using Focus Stacking to Extend Depth of Field," Retreived from; http://www.cambridgeincolour.com/tutorials/focus-stacking.html, downloaded on Oct. 16, 2014, 13 pages.

Xiang, Z., "Pixel-Level Fusion Algorithms on Multi-focus Image Fusion Chinese Master's Theses Full-text Database" Information Science and Technology, No. 2, Aug. 15, 2007, 73 pages.

English Translation of, Xiang, Z., "Pixel-Level Fusion Algorithms on Multi-focus Image Fusion Chinese Master's Theses Full-text Database" Information Science and Technology, No. 2, Chapter 4 DT-CWT-Based Multi-Focus Fusion, Aug. 15, 2007, pp. 28-54.

* cited by examiner

IMAGE REGISTRATION AND FOCUS STACKING ON MOBILE PLATFORMS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Traditional image or photo capturing techniques may allow only one focus per image, thus objects not in the same focus in an image may come out as blurry or unclear. Since multiple images of the same scene captured with distinct focus positions may carry details for each object, focus stacking (FS) may be used to combine details in a plurality of images into one image and make all objects in the scene perceived in details or a non-blurry fashion. The idea of this digital image technique is to obtain images closer to human visual perception. In effect, FS may increase the depth of field in an image with post-capture processing. Applications of FS may include macro photography and optical microscopy. Some traditional FS processes may use a high-end camera on a fixed position to take pictures, followed by a comprehensive off-site computing process. In another approach, a light-field camera, which may sometimes be called a plenoptic camera, has been used in recent years to realize FS, although this approach may require advanced micro-sensor technologies and comprehensive post-capture computations.

With the advancement of technologies, the resolution, linearity, and clearness of cameras in mobile devices have improved today. The advancement has also lead to increased aperture sizes, higher number of sensors, more choices of focus modes and points with a limited depth of field each, etc. For photography applications on mobile platforms or in mobile devices (e.g., cell phone, smartphone, tablet, hand-held camera, laptop), one touch of a screen may indicate a region of interest in the scene with a certain focus position. One image may be captured in one shot with a single focus position. There has yet to be on-site FS features on mobile devices readily available in the market. Thus, it may be desirable to integrate on-site FS capabilities into mobile devices to enhance user experience.

SUMMARY

In one embodiment, the disclosure includes a mobile device comprising a processor configured to merge a plurality of images each having a distinct focus position in a scene to generate a focus-stacked image that encompasses all focus positions of the plurality of images.

In another embodiment, the disclosure includes a method of image stacking in a mobile device comprising merging a plurality of images each having a distinct focus position in a scene to generate a focus-stacked image that encompasses all focus positions of the plurality of images.

In yet another embodiment, the disclosure includes an apparatus comprising a camera configured to capture a plurality of color images for one scene each with a distinct focus distance and a processor configured to register the plurality of color images to generate a plurality of registered color images, generate a plurality of luminance (Y) channels from the plurality of registered color images, and stack the plurality of Y channels to generate a focus-stacked Y channel.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are apparatuses, systems, and methods for improved focus stacking in mobile devices. This disclosure teaches merging or fusing a plurality of color images each with a distinct focus position to form a focus-stacked image that portrays all objects of interest as in focus. The color images may be captured as one set by a camera in an image stacking mode, which allows adjustable focus distances or positions based on multiple objects in a scene. The objects may be detected automatically by the camera or selected manually by a user. Then, the captured images may first be aligned via image registration and then be merged via focus stacking. In an embodiment, immigration registration may comprise down-sampling the images to generate an image pyramid comprising multiple layers with multiple sizes. Starting from a lowest layer and ending with a highest layer, template matching may be used to analyze motion data between images, and each layer may use motion parameters generated in its immediate lower layer. In an embodiment, focus stacking may comprise decomposing a luminance channel of each of the images using a wavelet transform to generate a multi-scale structure. Each level of the multi-scale structure has several frequency bands. Selection maps may be generated for the base band and high bands respectively, wherein the selection map of the high bands may take into account the selection map of the low band. Further, starting from a lowest level, each level may be merged to reconstruct focus-stacked images, and merging may be based on results obtained in lower levels. In an embodiment, each level of focus-stacked images may be progressively displayed to a user of the mobile device, so that he/she may determine whether the result is satisfactory. If not, the user may terminate a running process to save computation power and time. Overall, this disclosure may use existing camera features as well as create new features to generate focus-stacked images with on-site processing and displaying capabilities, which helps improve user experience.

Figure 1A:
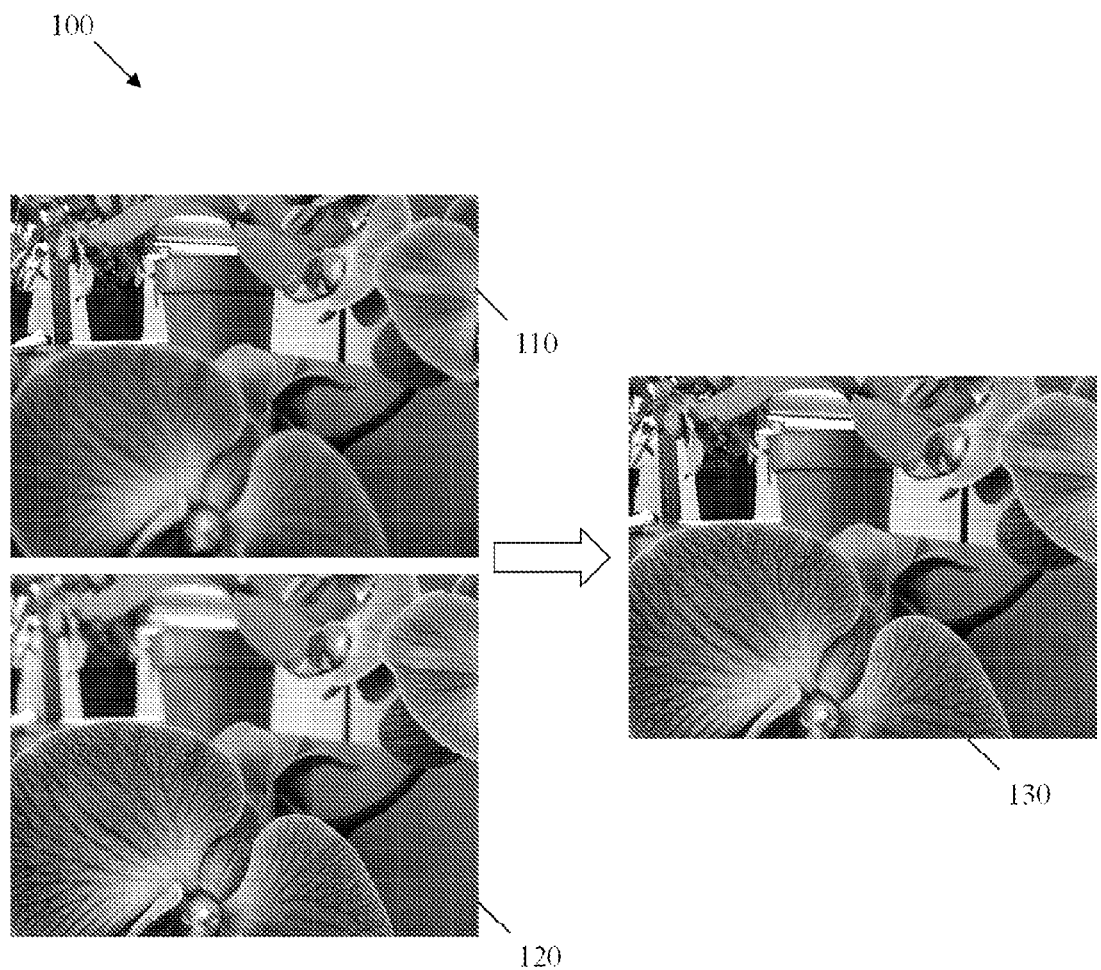
FIG. 1A illustrates an embodiment of an image stacking process.

FIG. 1A illustrates an embodiment of an image stacking (IS) process 100, which is performed on an exemplary scene comprising flowers in the foreground and a flowerpot in the background. A first image 110 has a focus set on the flowerpot with flower textures appearing blurry, while a second image 120 has a focus set on the flowers with the flowerpot appearing blurry. By performing FS to merge the images 110 and 120, an image 130 may be rendered with both flowers and flowerpot portrayed in focus, extending the effective field of depth. The detailed process of converting the images 110 and 120 into the image 130 are further described below.

Figure 1B:
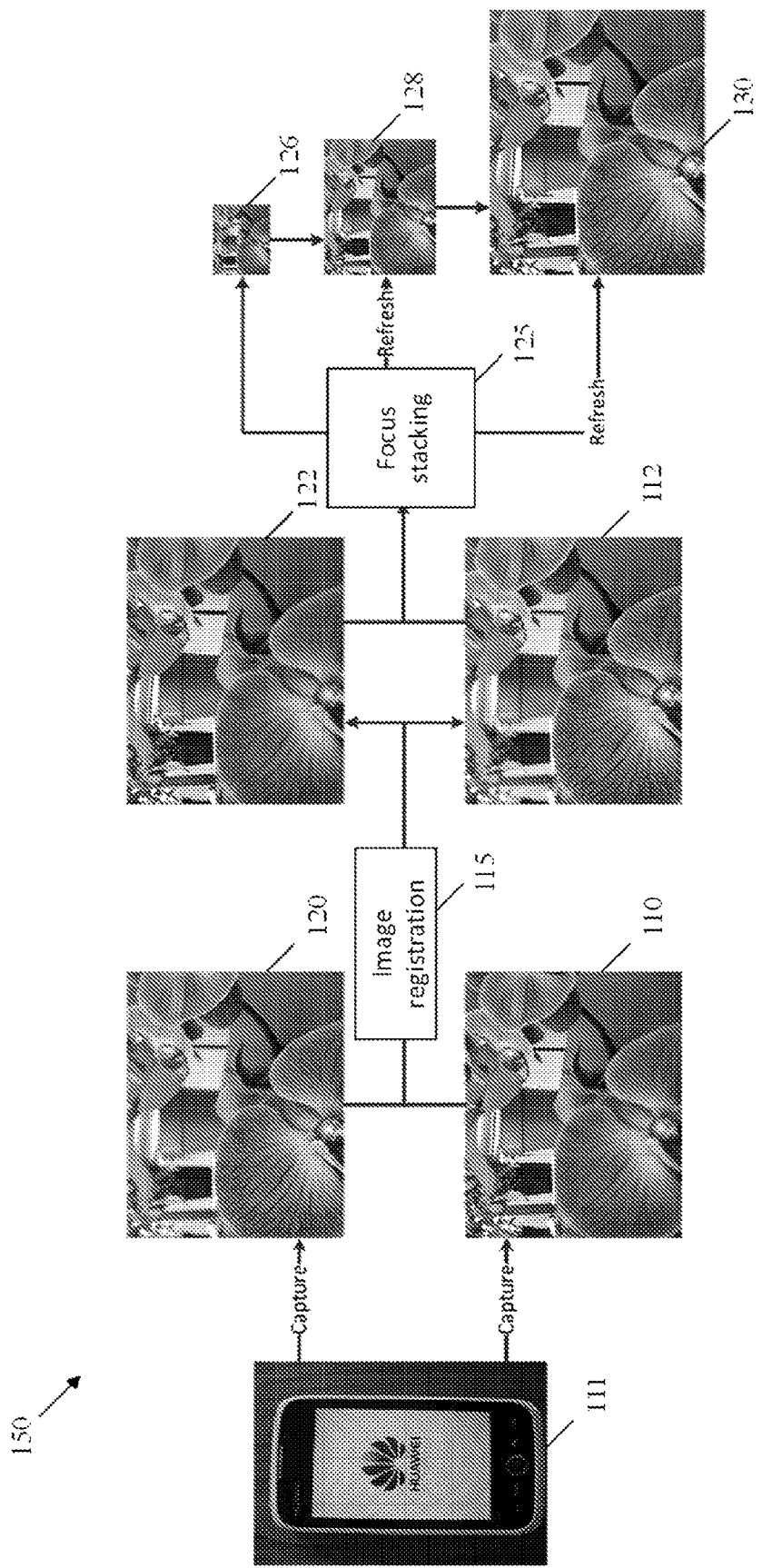
FIG. 1B illustrates an embodiment of an image stacking scheme.

FIG. 1B illustrates an embodiment of an image stacking scheme 150 implemented by an exemplary mobile device 111 (a smartphone made by HUAWEI with a touch screen) on the exemplary images 110 and 120. The images 110 and 120 may be captured by the mobile device 111, or received by the mobile device 111 from another device. Note that the scheme 150 serves merely as an example, thus one skilled in the art will recognize that any other type of mobile devices or any camera-equipped device may be configured to implement the image stacking schemes and methods disclosed herein, and any other number of images comprising any other scene or content may be processed similarly by embodiments disclosed herein.

In an embodiment, the mobile device 111 may be equipped with a camera capable of automatically detecting multiple objects and their respective focuses in an image area or frame. When the camera detects one or more objects in one focus area and one or more other objects in another focus area, it may indicate that one captured image may be insufficient to have all objects displayed clearly and in focus. In other words, several images may need to be captured in different focus modes or focus positions, followed by focus stacking to get a better result. In this case, an application built in the mobile device 111 may prompt a notification or suggestion (e.g., by displaying a message on a screen of the mobile device 111) to a user of the mobile device 111, stating that an image stacking mode (sometimes referred to as an IS mode) is recommended. Otherwise, if the camera detects that only one focus position or one main focus position is present in the scene, the user or image-capturer may take one image in an auto focus mode.

If the user chooses to use an image stacking mode, multiple objects (sometimes referred to interchangeably as subjects) may be selected either automatically as described above or manually. The camera may be operated via an application (sometimes referred in short as an app), which can be implemented as software and/or hardware. In a mobile setting, the application may be real-time or near real-time in terms of processing and interaction with the user, and the mobile device 111 may have a touch screen, so the user may manually touch different positions on the screen to select several objects he/she wants to focus. Manual selections may also be made (or tags be created) by circling multiple objects to indicate that the circled object should be in focus in a final merged or fused image. Following selection of objects in a scene, a number of images may be captured by the camera, each with a different focus mode or focus distance. For example, two images 110 and 120 are captured in the scheme 150. Objects of interest selected manually or automatically may be set to high confidence or given high priority in FS algorithms. The high confidence may be a weight in a voting system to increase a number of tickets for the selected object.

Changing a focus mode or focus distance may alter a field of view or a scale of the same scene to a certain degree (e.g., zoom in and zoom out). Also, there may be global motion or global movement between capturing multiple images, e.g., caused by hand shaking of the user, which may somewhat shift or alter the captured area. In addition, there may be local motion or local movement between multiple images, e.g., caused by a moving object (e.g., a person or an animal walking) in the scene. Thus, an image registration (IR) module, unit, or algorithm 115 may be used to register or align these images prior to FS. IR may retain a common part and leave out all uncommon parts in each image. For example, the image 110 may be converted to an image 112, and the image 120 to an image 122. As shown in FIG. 1B, the images 112 and 122 share a common area or field of view, although with different focus positions. Each focus position may portray a certain part of the scene as clear and in focus, while leaving other parts less clear.

During image registration, an amount of global and/or local motion may be determined by comparing different images. If the motion data is determined to be too large (e.g., higher than a pre-set threshold), it may indicate a large shift or scale change caused by local and/or global motion between two images. In this case, to save computation time and avoid a bad focus stacking result, which may depress the user, any running IR algorithm may be stopped or terminated immediately. Then, the application may give a feedback to the user, suggesting him/her to hold still and retake or recapture images. Otherwise, if the motion data are within the pre-set threshold, IR and FS algorithms may continue to align and merge these images to generate a final image.

Sometimes, due to resource limitation and time sensitivity of image or photo applications in mobile devices, it may take a relatively long time (e.g., tens of seconds) to process large images and display a final merged image. A user may not have the patience or wish to waste too much time in waiting for the final image to show up, instead he/she may wish to see the final image as soon as possible. For example, this may occur when the user wishes to take another picture quickly, or if the final merged picture is unsatisfactory, the user may wish to have more time to retake pictures. Further, nowadays the picture size supported by mobile devices may be relatively large (e.g., 1092×1080 pixels or larger), even though the screen size is still limited (e.g., less than about 6 inches for smartphones).

In this disclosure, a FS module or algorithm 125 may employ a progressive pyramid algorithm in mobile devices, which may allow the user to see merged images relatively quickly. In an embodiment, a pyramid algorithm may be based on wavelet transform, which may decompose a plurality of registered images into a number of levels each comprising several different frequency bands, e.g., including a base band and one or more higher level bands. Starting from a lowest level, the pyramid algorithm may generate base band of different images, merge the base bands together, and display the focus-stacked base band image to the user first. Simultaneously, the FS algorithm 125 may continue processing the higher levels in the pyramidal structure and refreshes the display image after it finishes merging each higher level. For example, as shown in FIG. 1B, a small image 126 may be displayed first, followed by a medium image 128, and the full size image 130. The progressive FS process may stop after all levels are processed and the final focus-stacked image is displayed. In an embodiment, an application running the FS algorithm 125 may be designed such that the progressive FS process may be terminated by the user anytime, e.g., when the user finds that the small image 126 proves unsatisfactory. The early termination may help save power of the mobile device and time of the user. Alternatively, even if the FS process proves satisfactory, the user may elect to have the remaining FS steps running in the background. In this case, a user interface (e.g., touch screen) may be made available for the user to perform other tasks, such as capturing another image without having to wait for the whole FS process to finish.

Figure 2:
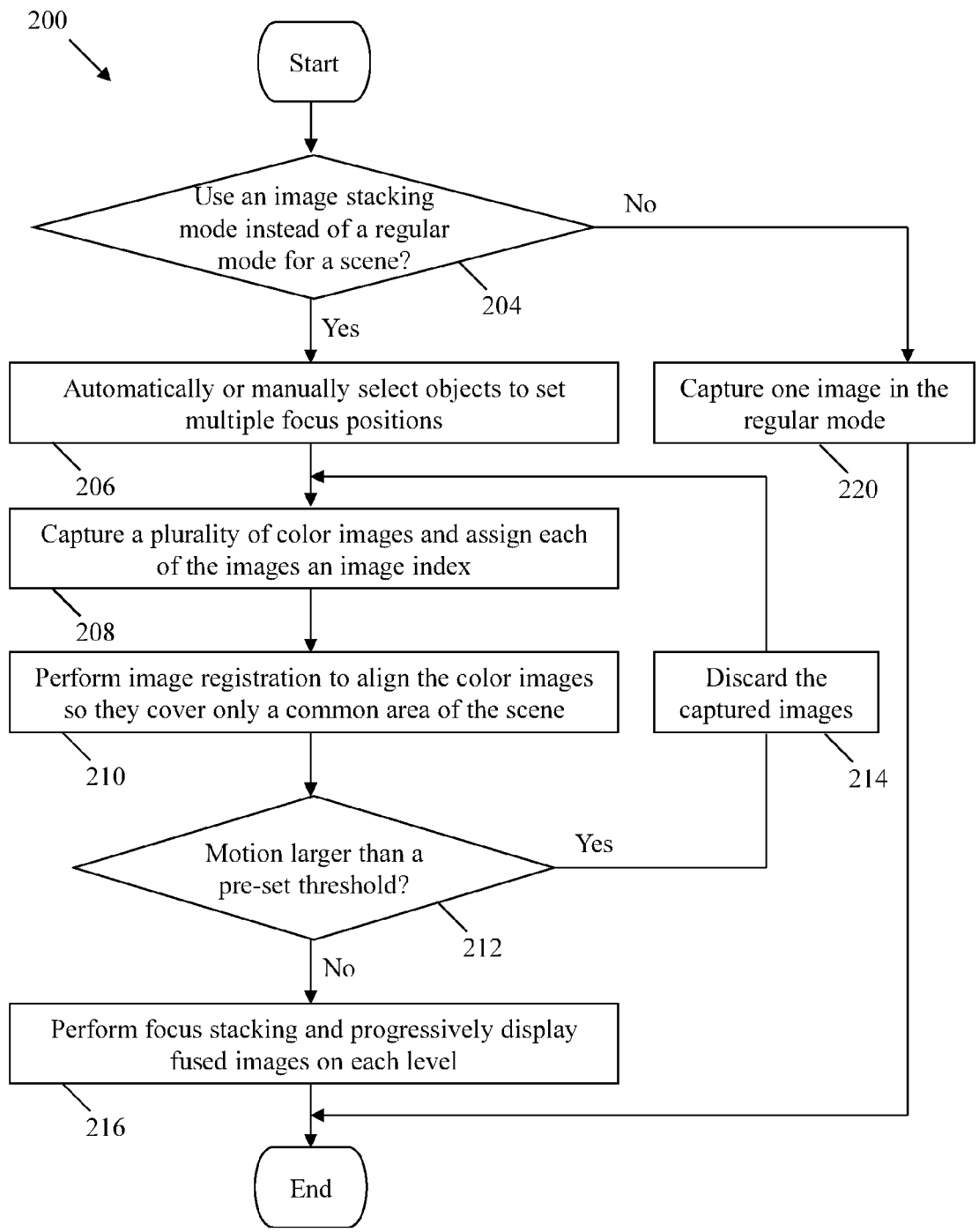
FIG. 2 illustrates an embodiment of an image stacking method.

FIG. 2 illustrates an embodiment of an image stacking method 200, which may be implemented by a mobile device equipped with a camera. The method 200 may start in step 204, in which an application managing functions of the camera may suggest a user to select an image stacking mode instead of a regular mode (e.g., an auto, macro, or infinity mode). Depending on the implementation, the application may prompt a message asking the user to use the IS mode when multiple focuses are detected, or the user may elect to enter the IS mode anytime. If the IS mode is not selected in step 204, the method 200 may proceed to step 220, where one image may be captured in the regular mode with a single focus distance. Otherwise, the method 200 may proceed to step 206.

In step 206, multiple objects may be selected corresponding to multiple focus positions. Depending on the implementation, selection of objects may be automatic (e.g., by detecting a plurality of objects with different distances from the camera lens) or manual (e.g., by pointing to or circling each object of interest on a touch screen). In step 208, a plurality of images may be captured with a relatively short time interval (e.g., 3 seconds, 2 seconds, 1 second, or less) between each two consecutive images. The plurality of images may be color images or black/white images, depending on camera setting. A number of captured images is determined by a number of objects detected in the scene or a number of objects selected by the user. As some objects may have a same distance from the camera, in which case only one image is needed for these objects, the number of captured images may be equal to or less than the number of objects. Further, each captured image may be assigned an image index so that they may be uniquely identified. In step 210, image registration may be performed to align the unaligned color images, so that any uncommon area of the scene may be cropped or cut out, leaving only a common area of the scene in each image. If the captured images already cover the common area, the step 210 may be skipped or implemented but not cropping any area. In step 212, the application may determine whether a global motion and/or a local motion is larger than a pre-set threshold. If the condition in step 212 is met, the method may proceed to step 214, where the captured images may be discarded and any running process terminated. Otherwise, the method 200 may proceed to step 216. After step 214, the method 200 may return to step 208 to recapture a plurality of additional color images. In implementation, the mobile device may provide a suggestion to the user to recapture the plurality of additional color images. If the suggestion is accepted by the user, in step 208, the camera may recapture the plurality of additional color images.

In step 216, FS and progressive display of fused images may be conducted simultaneously. For example, a small image representing a base band of a lower level (with low resolution) may be focus stacked first and displayed first. Then, a larger image representing a base band of a higher level (with higher resolution) may be focus stacked and displayed. This may continue until a full-sized final image is displayed. In some embodiments, the user may elect to have FS running in the background of an operating system. If the user is not satisfied with any displayed image, he/she may terminate the FS process before it completes.

Embodiments of image stacking schemes disclosed herein may comprise an image registration stage and a focus stacking stage, the details of which are further described in the following paragraphs. Although only two images are used herein to illustrate working principles, one skilled in the art will recognize that similar principles may be extended to three or more images within the scope of this disclosure.

In general, image registration may be a process of overlaying images of the same scene taken at different times and/or with different focus distances. Image registration may geometrically align the reference and sensed images (thus referred to as register the images). In an embodiment, a pyramid approach may be employed to reduce computational cost, e.g., due to large size of images. Further, template matching may be employed to find the shift and scale of captured images, and use motion parameters to align these images.

Figure 3:
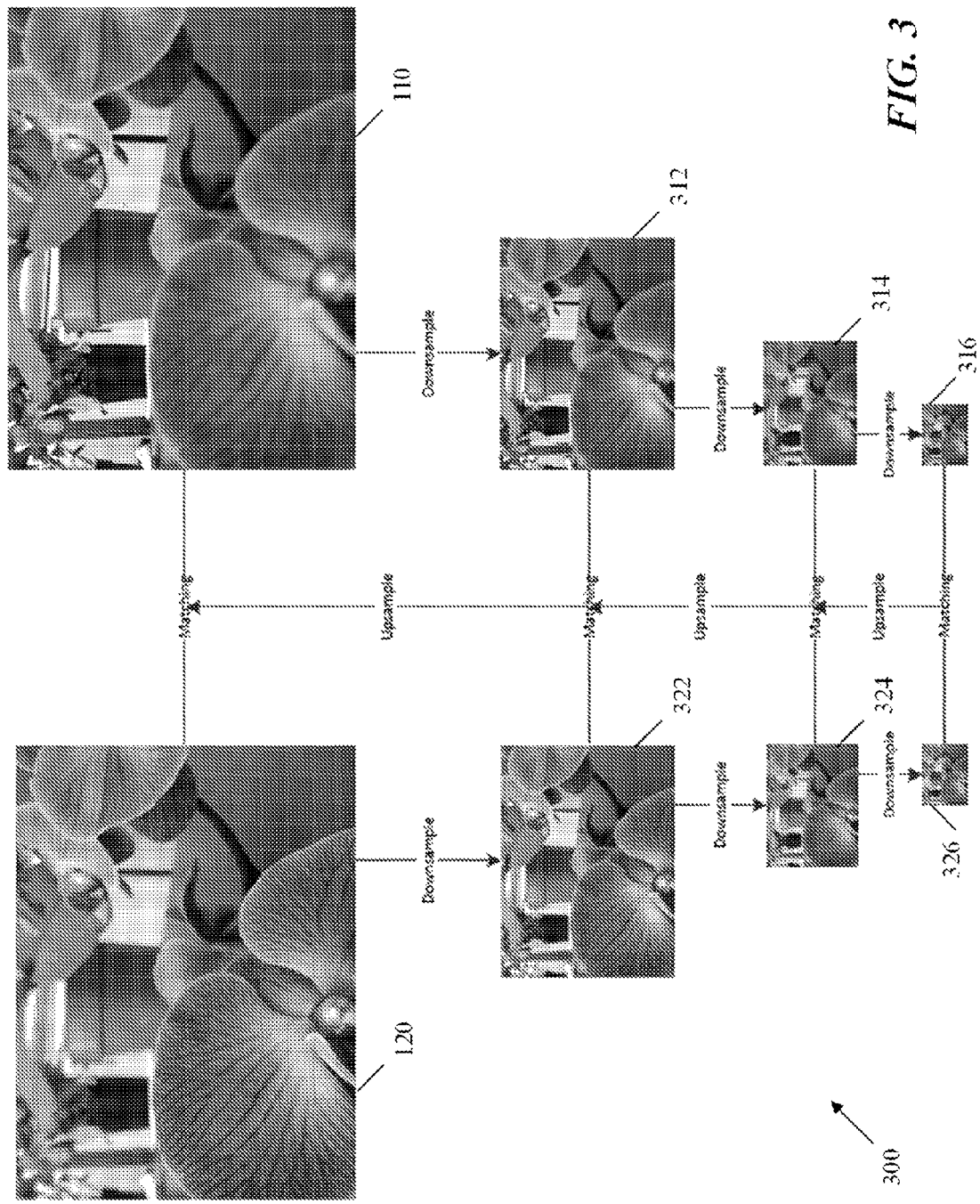
FIG. 3 illustrates an embodiment of an image registration (IR) scheme.

FIG. 3 illustrates an embodiment of an image registration scheme 300 performed on two exemplary color images 110 and 120, which has been shown in FIG. 1B. Since the full-size images 110 and 120 may have relatively high resolution, and thus takes more time to process, down-sampling may be used so that lower resolution images may be processed first. In the scheme 300, the unaligned or unregistered images 110 and 120 may be first down-sampled or down-sized into smaller images respectively. Down-sampling may lead to two lop-sided image pyramids comprising a number of layers, which represent different resolutions of the same original images. Alternatively, the two image pyramids may be considered as one image pyramid that has two images on each layer. As shown in FIG. 3, the image 110 may be down-sampled to an image 312, then to an image 314, and finally to a smallest image 316 in the lowest layer. Similarly, the image 120 may be down-sampled to an image 322, then to an image 324, and finally to a smallest image 326. Note the down-sampling rate or step for each resolution layer is 2:1, but it should be understood that any other down-sampling rate may be used. In general, a higher down-sampling rate (e.g., 4:1, 6:1, 8:1) may save more computation time. Further, depending on the implementation, the images 110 and 120 may be down-sampled to a lowest layer with a pre-defined size (e.g., 22×32 pixels), or all the way to one pixel.

Starting from the lowest layer, template matching may be used to determine motion data or information between two images on the same layer. As shown in FIG. 3, template matching starts between images 316 and 326. In order to save computation resource and/or time, in some embodiments, only consider 9 shift positions may be considered when analyzing motion parameters for a particular pixel. The 9 positions may include the pixel and its 8 direct (D8) neighbors (i.e., pixels located on top, bottom, left, right, top-left, top-right, bottom-left, and bottom-right). Note that there is no neighbor if there is only one pixel in the lowest layer. In template matching, sample intervals of the scale may be determined first, and then the sample intervals may be used to compute a difference between two images. For example, the scale intervals may be sampled into several candidates: (imageWidth+2)/imageWidth, 1, (imageWidth−2)/imageWidth, and so on, where imageWidth denotes a width of the image being processed. These scale candidates may be used to scale the image and compute the difference toward the reduction of mismatch between two images.

A minimal mismatch between two images may be selected as the best scale step. After template matching between two images, motion parameters regarding pixels of the two images may be obtained. The motion parameters may include shift, scale, rotate, tilt, and other parameters if necessary. If any of the motion parameters exceeds a pre-set threshold (each parameter may have a different threshold), it may indicate that the image area has shifted significantly due to global motion, e.g., the camera has moved when taking the two images. In this case, the image stacking process may be terminated immediately in order to save computation time and avoid a bad final result, which may upset the user. In other words, the image stacking process may continue only if all of the motion parameters are within the pre-set threshold. Further, after early termination, the application may give a suggestion to the user, reminding him/her to hold still and take another image(s). Since template matching starts from the lowest layer, which is the easiest to process, computation time may be minimized should the process need to be terminated early.

Motion parameters, such as alignment shift and scale, at each layer may be aggregated for a higher layer. In other words, the motion parameters may be up-sampled from lower layers to be used at higher layers. In a higher layer, the motion parameters computed in its immediate lower layer may be used (with up-sampling) as initial motion parameters to further compute parameters (e.g., shift and scale) of the higher layer using the same algorithm. Computation of motion data for each layer may continue until reaching the highest layer, which correspond to the original resolution or full size. As shown in FIG. 3, the motion parameters from the matching of 316 and 326 are up-sampled for its immediate higher layer of 314 and 324; the motion parameters from the matching of 314 and 324 are up-sampled for its immediate higher layer of 312 and 322; finally to a highest layer of images 110 and 120. In the highest layer, final motion data, such as shift and scale parameters, may be obtained. Using these parameters or factors, two images may be aligned or registered. Consequently, the common part or area (i.e., part appearing in all images) may be retained as the valid part of each image. Although portrayed as grayscale, note that the images in FIG. 3 may be color images including all color channels or components.

Moreover, the scheme 300 may be used to detect local motion within the scene. For example, when calculating a difference between two images, if the difference appears to be small for most corresponding pixels in the two images but large for some corresponding pixels, it may be an indication that local motion has occurred when taking the two images. For example, an object (e.g., a cat or a person) has moved in position. Using this concept, the local motion may be detected and used in the subsequent focus stacking stage.

Figure 4:
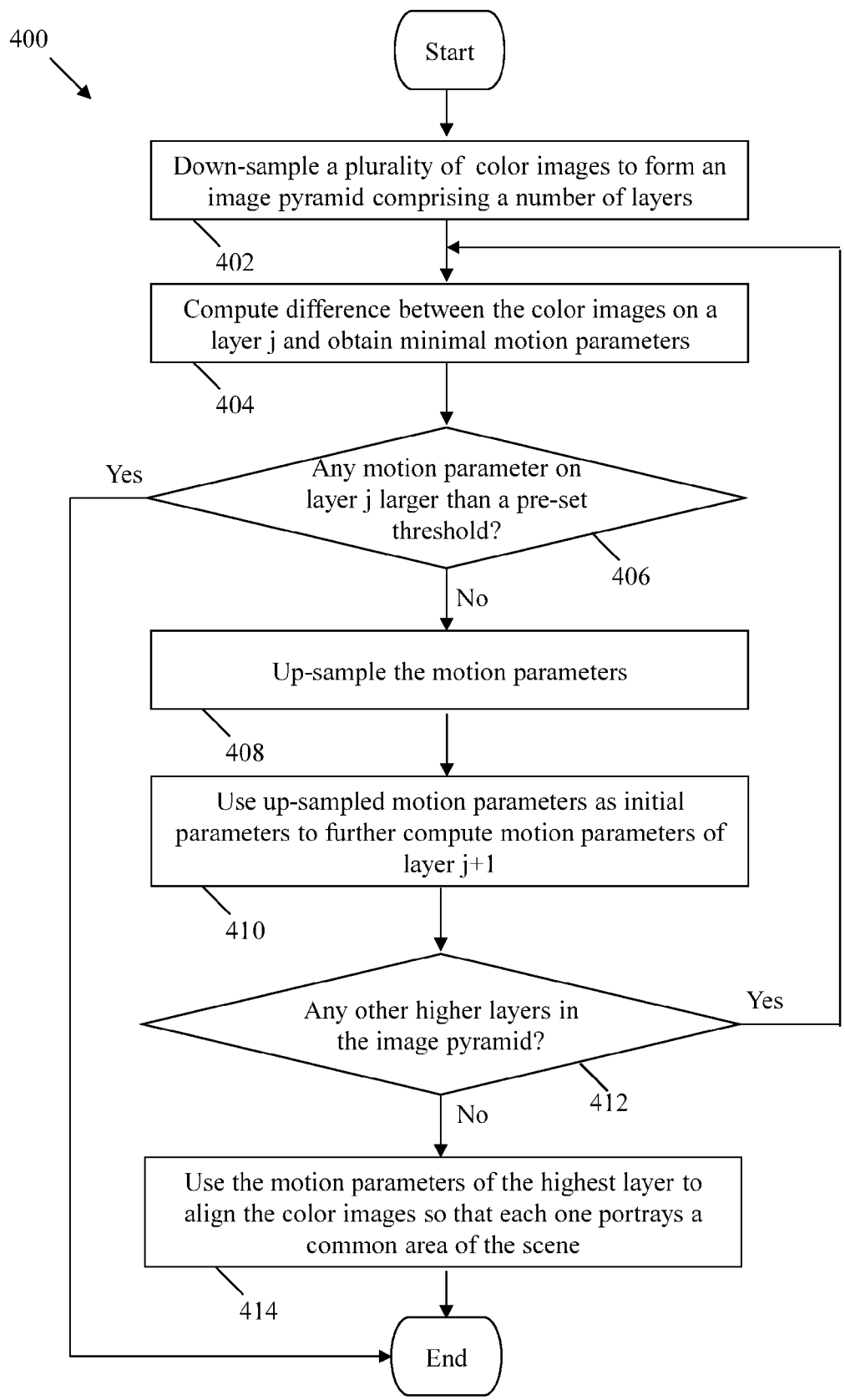
FIG. 4 illustrates an embodiment of an image registration method.

FIG. 4 illustrates an embodiment of an image registration method 400, which may be implemented as part of the image stacking method 200. A plurality of color images may have been captured or received by a mobile device before execution of the method 400. The method 400 may start in step 402, where the plurality of color images may each be down-sampled to lower layers, forming an image pyramid containing J layers of resolutions or sizes, where J is a positive integer. The number of layers may depend on the size of the original images, that is, larger original images may result in more layers in the image pyramid. In step 404, a difference between images on a layer j may be compared and minimal motion parameters may be obtained for the layer j, wherein j is an integer between 0 and J−1 and represents a layer index. In use, an initial j value (corresponding to the lowest layer and usually 0) is used when step 404 is executed for the first time, and then j consecutively increases until reaching the highest value (corresponding to the highest layer).

In step 406, the method 400 may check whether a motion has surpassed the pre-set threshold. If the condition in the step 406 is met, the method 400 may end; otherwise, the method 400 may proceed to step 408, where motion parameters, such as shift and scale parameters, for layer j may be up-sampled. For example, if the down-sampling rate was 2:1 and the motion shift parameters of layer j is denoted as (dX, dY), then the shift parameters may be up-sampled to be (2*dX, 2*dY) for layer j+1.

In step 410, the up-sampled motion parameters may be used as initial data to further compute motion parameters of layer j+1. Any appropriate algorithm or codes may be used in computing motion parameters. In step 412, the method 400 may determine whether there is any additional higher layer to compute motion data for. If the condition in the step 412 is met, the method 400 may return to step 404, where a difference between the higher layer may be computed (note that now the j value will be increased again); otherwise, the method 400 may proceed to step 414. Since the final motion data for the highest layer has already been determined by now, the method 400 may use the final motion data (e.g., shift and scale parameters) to align the images in step 414.

It should be understood that image registration may sometimes be skipped, if the photography equipment may ensure that all captured images have a common area of the scene. For example, if a tripod is used to affix a mobile camera, the plurality of captured images may be directly merged via FS without being aligned first. Even in this case, immigration registration may still be performed, e.g., if it is built in as an inherent part of an IS algorithm, but it may no longer need to cut out any area of the scene.

Figure 5:
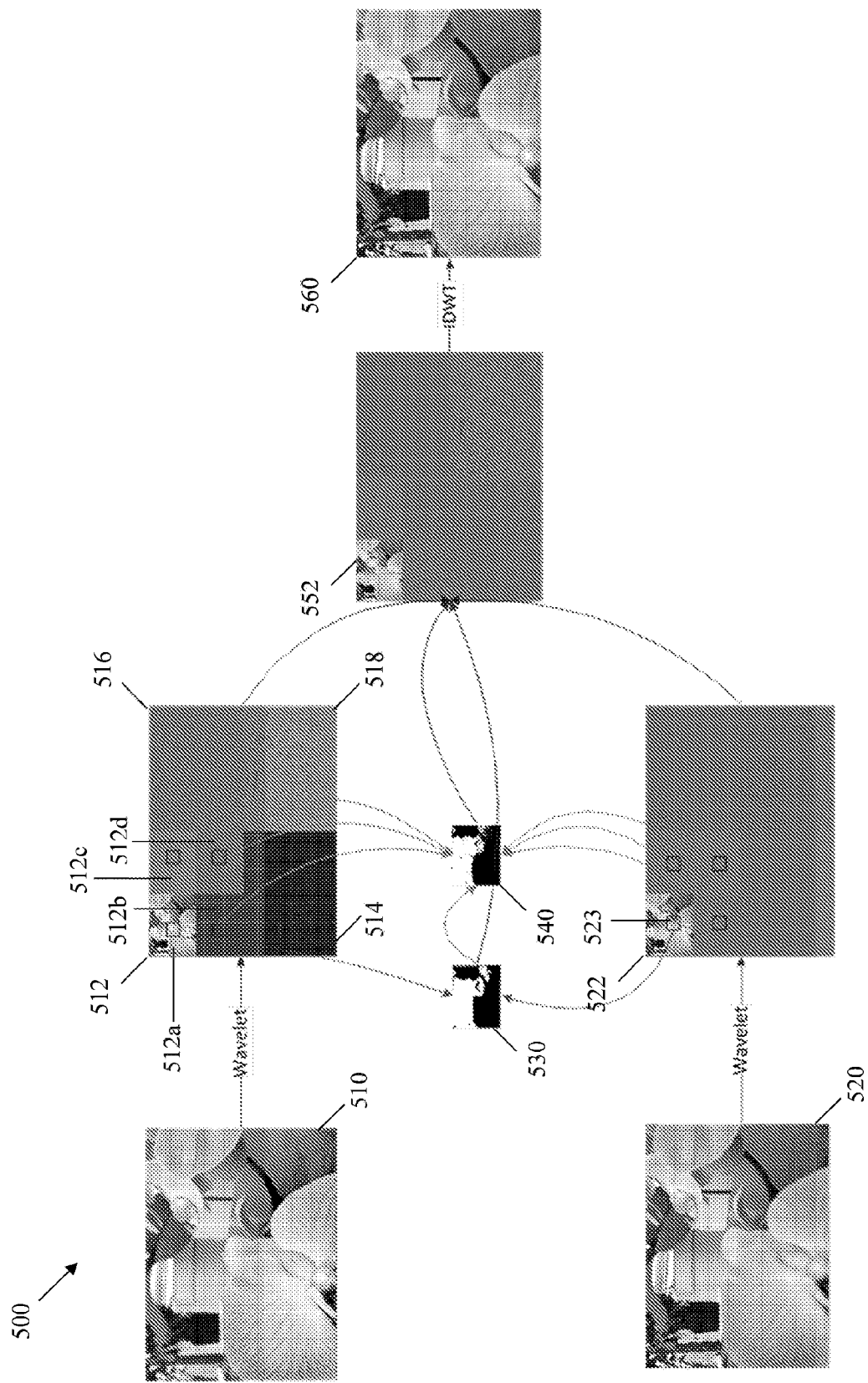
FIG. 5 illustrates an embodiment of a FS scheme.

FIG. 5 illustrates an embodiment of a FS scheme 500, which employs a wavelet-based algorithm. When performing FS, if images are originally represented in a red, green, and blue (RGB) color space, each image may first be transformed from the RGB space to a luminance and chrominance (i.e., YCbCr) color space. In the YCbCr space, the sharpness of chroma channels or components Cb and Cr may not be as significant as that of the luma component Y, and there may be high correlation between focus characteristic of the Y channel, Cb channel and Cr channel. Considering the limited computational capability of mobile devices, in an embodiment, Y is selected as the representative component of the image to save computation power and/or time. Accordingly, a focus stacking process may be performed for the Y channel, while the Cb and Cr channels may use the result of channel Y to merge the Cb and Cr images respectively. As shown in FIG. 5, two images 510 and 520 represent the Y channels of two images being focus stacked.

In an embodiment, discrete wavelet transform (DWT) may be used to decompose the channel Y images. DWT may carry both spatial and frequency characteristics. The level of decomposition depends on the full size of an original image, the larger the image is, the more levels the decomposition has. In the decomposition process, a low-pass filter and high-pass filter may be applied as a pair onto the rows and columns respectively in the original image. Accordingly, the original image may be decomposed into four sub-images representing the low-low (LL), low-high (LH), high-low (HL), and high-high (HH) wavelet frequency bands. Consider an image of size N×N, with one level of decomposition, each wavelet frequency band contains N/2×N/2 samples, which may also be referred to as wavelet transform coefficients. If needed later, the four bands may be integrated again to generate an output image with the same number of pixels as the original image. As shown in FIG. 5, the image 510 is decomposed into four frequency bands 512, 514, 516, and 518 respectively located in four quadrants of the image 510.

Coefficients in decomposed frequency bands may carry different information about the original image. Specifically, the LL band 512 may represent a lower-resolution version of the original image, the LH band 514 may represent sample variations along the columns (i.e., in the horizontal direction), the HL band 516 may represent sample variations along the rows (i.e., in the vertical direction), and the HH band 518 may represent sample variations along the diagonal direction.

In implementation, since decomposition may often be more than two levels, the above 2-D wavelet decomposition can be applied again to the LL band 512, forming a LL sub-band 512a, a LH sub-band 512b, a HL sub-band 512c, and a HH sub-band 512d located respectively in the four quadrants of the band 512. Decomposition may continue until a pre-determined threshold is met. The levels of decomposition depends on the size or resolution of original images, that is, the larger the original image is, the more levels decomposition may generate. Similarly, the image 520 may be decomposed into multiple levels of bands or sub-bands. Note that although decomposition may lead to a multi-scaled pyramidal structure, which may be similar to the image pyramid formed by down-sampling, a number of levels generated by decomposition may or may not equal a number of layers generated by down-sampling. For example, if down-sampling uses a rate higher than 2:1, there will be less down-sampled layers than decomposed levels.

Since features and objects may be in focus in some images and out of focus in other images, characteristics of in-focus and out-of-focus may need to be measured for proper focus stacking. In an embodiment, the complexity of an image and a high frequency part of the image may be used to measure the focus characteristics. With the scale property of DWT, determination of how much an image is in-focus or out-of-focus may be performed in a localized area of the image, such as a pixel or a block of pixels (e.g., a window containing 5×5 pixels). For a window of a certain size, a higher complexity may often indicate a higher probability of the pixel or the window being in focus.

Depending on whether a coefficient is in a LL band, complexity may be measured using different algorithms. In an embodiment, in the LL band of a lowest level, the complexity of a pixel may be measured using gradients of its neighboring sample differences in a window (e.g., 5×5). For example, if two neighboring pixels are used on each side, a 5×5 window may be formed. In a window with a size denoted as winSize (often an odd integer), pixels may be denoted as P(i, j), wherein i is a row index and j a column index, and wherein both i and j are between 0 and winSize−1. Note that the current pixel is located at the center of the window with a position of ((winSize−1)/2, (winSize−1)/2). In each LL band of the lowest level, the complexity of P((winSize−1)/2, (winSize−1)/2) may be computed via the following equations:

$$C_{row} = \sum_{i=0}^{winSize-1} \sum_{j=1}^{winSize-1} [P(i, j) - P(i, j-1)]^2 \quad (1)$$

$$C_{col} = \sum_{j=0}^{winSize-1} \sum_{i=1}^{winSize-1} [P(i, j) - P(i-1, j)]^2 \quad (2)$$

$$C = C_{row} + C_{col} \quad (3)$$

where $C_{row}$ denotes complexity along the rows and $C_{col}$ denotes complexity along the columns, and C denotes total complexity for the current coefficient at ((winSize−1)/2, (winSize−1)12). Note that although a square window is used where its width equals its height, one skilled in the art will recognize that a non-square window may be similarly implemented within the scope of this disclosure.

In the scheme 500, since there are two images 510 and 512 being decomposed, two complexities may be computed for each coefficient position in the LL band of the lowest level. Based on the computed complexities (i.e., C), a first selection map 530 may be generated using a choose-max algorithm, which may compare the complexities of corresponding coefficients in each candidate wavelet image. The wavelet image with the highest complexity may be stored in the selection map 530. As previously mentioned, each captured image may be assigned an image index, and this index may be stored in the selection map to identify an image. Suppose that, for example, 5 images (note any other number works) were captured with index values of 1-5. After decomposition, 5 lowest level LL band images may be generated also with index values 1-5. For a coefficient located in the same relative position in each of the 5 LL bands, 5 complexities may be computed. In this case, the selection map 530 may store the index of the image which has the highest complexity. For instance, if image 3 has the highest complexity for the coefficient, the index of 3 may be stored in the selection map 530 for the coefficient.

Since the first selection map 530 may consider only local information of each LL band, it may affect the continuity of coefficients in the images and introduce noise or discontinuity into the selection map 530. For example, if one coefficient is selected from image 3, while all of its D8 coefficients are selected from image 4, the one pixel may appear discontinuous from its neighbors or noisy (even though image 3 has the highest complexity for the coefficient). Thus, to remove or reduce noise in the selection map 530, a voting system may be employed, which may count the number of index values for each candidate image in a window of pre-defined size (e.g., 5×5). An index that appears most often may be voted or selected as the final index for the coefficient. For example, a 5×5 window centered at a coefficient P(i, j) includes 25 coefficients. If 13 of the 25 coefficients have a certain image index in the selection map, this image index may be treated as the majority image index, since it appears more often than any other image index. Then, the majority image index may be assigned to the coefficient P(i, j), regardless of its original image index. Alternatively, to reduce computation complexity, the majority image index may be assigned to all 25 coefficient positions in the window, regardless of their original image indexes. It should be noted that the determination of a majority index may depend on implementation. In some cases, an image index appearing the most often may be voted as the majority, while in other cases, an index value appearing a pre-set number of times (e.g., equaling half or ⅔ of a number of coefficients in a window) may be voted as the majority. Further, a smaller window size may lead to more accuracy but increased computation load, while a larger window size may lead to less accuracy but decreased computation load. In any event, the voting system may help smoothing variations in the selection map. The voting system may be repeated for a portion or all of the windows in the candidate images.

It is known that an image may sometimes have a smooth region or part (e.g., a clear blue sky, a white wall, or a dark hole, etc.), in which no sharp features are contained and neighboring coefficients do not vary significantly. Sometimes, it may be difficult to distinguish whether a smooth part is in-focus or out-of-focus. Thus, in some embodiments, the smooth part of candidate images may be identified and then excluded from the voting system. Any suitable algorithm may be used to identify a smooth part. For example, a pre-set threshold based on the complexity values described above may be used to determine whether a pixel in the LL image is located in the smooth part. In an embodiment, if an absolute difference between the complexities, denoted as abs(C1−C2), of a pixel in these two images is smaller than a tenth of a maximal complexity denoted as max(C1,C2)/10, where C1 and C2 are the two complexities of the pixel, then this pixel is identified as in the smooth part. Further, after identification, the smooth part may be excluded from the voting system. Instead, pixels in the smooth part may come from any of the candidate images, or come from all candidate images each with average contributions.

In contrast to the LL band, which may measure complexity using a sum of squares of coefficient differences (e.g., using equations (1)-(3)), in the high bands HL, LH, and HH, complexity may be measured using a sum of squares of coefficients. As coefficients in the high bands correspond to high frequency information of original images, using the sum of squares of the wavelet coefficients may help save computation time. In an embodiment, for a pixel located at ((winSize−1)/2, (winSize−1)/2) in a selected window with both width and height equaling winSize, the total complexity of P((winSize−1)/2, (winSize−1)/2) is computed via the following equation:

$$C = \sum_{i=0}^{winSize-1} \sum_{j=1}^{winSize-1} P(i, j)^2 \qquad (4)$$

Further, the three high bands HL, LH, HH may be jointly considered in order to save computation time and avoid discontinuity in the same relative position. For example, as shown in FIG. 5, a second selection map 540 may be generated for the high bands of the two images. Further, in a voting system to determine the selection map 540 for the high bands, the selection map 530 of the LL band may be considered as a weight, and this weight may be based on the confidence of the LL band. For example, we may have N0 pixels selected from a first image (Image0) and N1 pixels selected from a second image (Image1). We may set a weight W based on the confidence of the LL band. The higher the confidence is, the larger W is, and vice versa. If the LL band chooses Image0, then an adjusted number of pixels selected from Image0 may be (N0+W), and the number of pixels selected from Image1 may still be N1. The final result is based on the adjusted numbers. This cross-band-based method may help reduce or avoid discontinuity among different frequency bands, thereby improving the accuracy of focus stacking.

After generating selection map 530 for the base band, wavelet coefficients from the candidate LL wavelet images 512 and 522 may be selected according to the selection map 530. Then, the selected coefficients may be merged or fused to reconstruct a LL band 552, as shown in FIG. 5. Similarly, after generating selection map 540 for the high bands, wavelet coefficients from the candidate LH, HL, and HH wavelet images may be selected according to the selection map 540. Next, on a higher level above the 512, 514, 516, and 518 bands, a similar merging process may be performed, and selection maps for the higher level may be determined based on the selection maps 530 and 540. This cross-level approach may help improve FS accuracy and efficiency. Eventually, after all the levels are completed, inverse DWT (IDWT) may be used to reconstruct a merged channel Y image 560.

After reconstructing the Y channel, reconstruction of the Cb and Cr channels may use the selection maps of the Y channel. Both selection maps for the low band and high bands may be used to merge the coefficients and get the final Cb and Cr channel images. Compared with reconstructing Cb and Cr independently from low bands, the disclosed algorithm may help reduce computation time. In addition, since the YCbCr color space was originally converted from the RGB space, to properly display a focus stacked image, YCbCr components may now be converted back to the RGB space.

During FS, if local movement has been detected in the images, an application executing the FS algorithms may attempt to solve the impact of local movement. As mentioned previously, local movement may be detected in the image registration stage prior to FS. Thus, after detection of local motion, the application may obtain pixel positions of one or more moving objects. Then, the moving objects may be treated as a special part of the images. In focus stacking process, based on the selection map(s), the application may determine which of the candidate images most clearly portrays (in focus) the moving objects. In an embodiment, an image index that appears most often may be determined to best portray the moving object. Finally, the application may extract the whole moving object from this image, and merge the moving object into the final focus stacked image. Moreover, if the local motion is determined to exceed a pre-set threshold, the candidate images may be regarded as invalid and the FS process may be terminated immediately. A user of the mobile device may be suggested to retake the images in the image stacking mode or a regular single-focus mode.

Figure 6A:
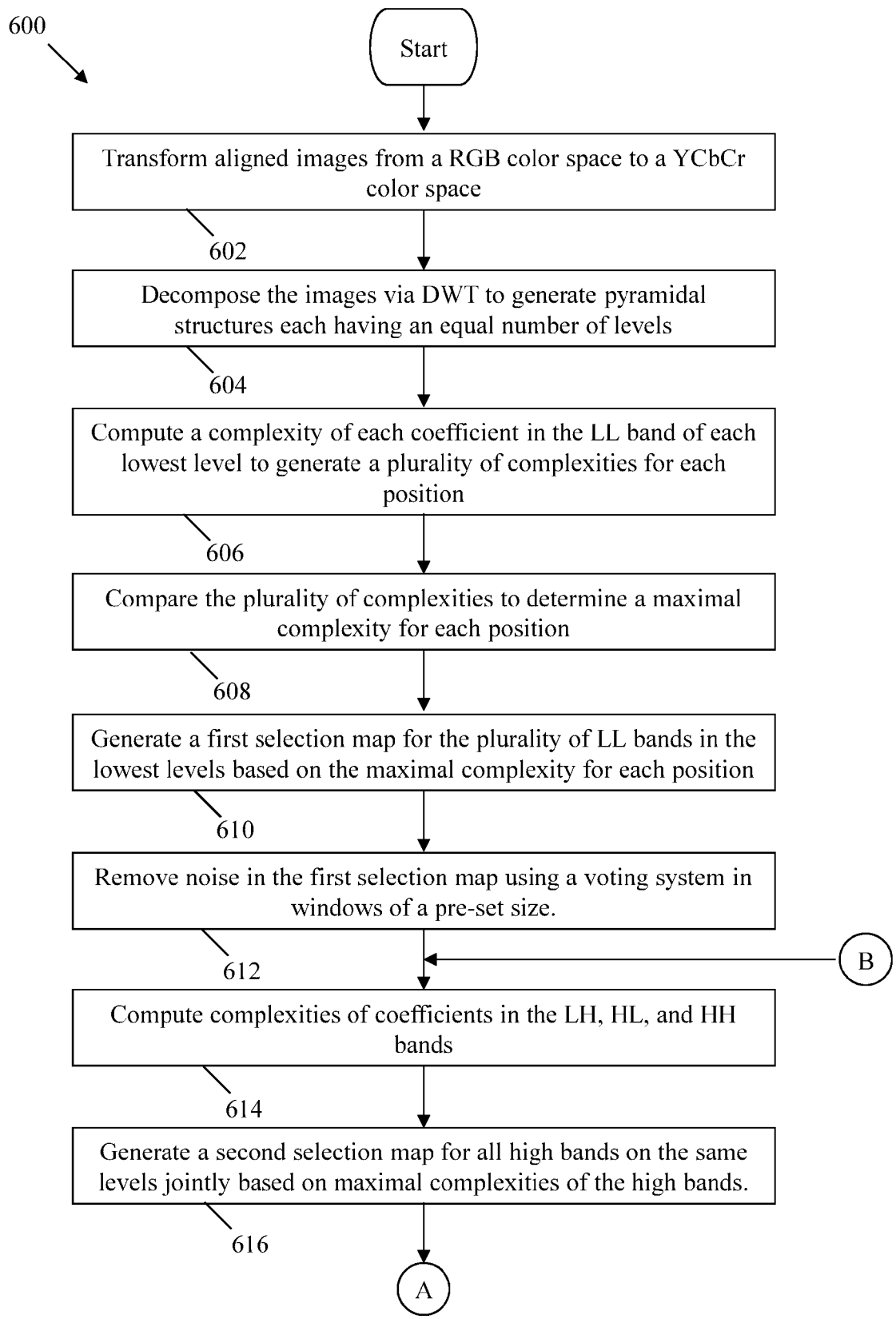
FIGS. 6A and 6B illustrate an embodiment of a focus stacking method.
Figure 6B:
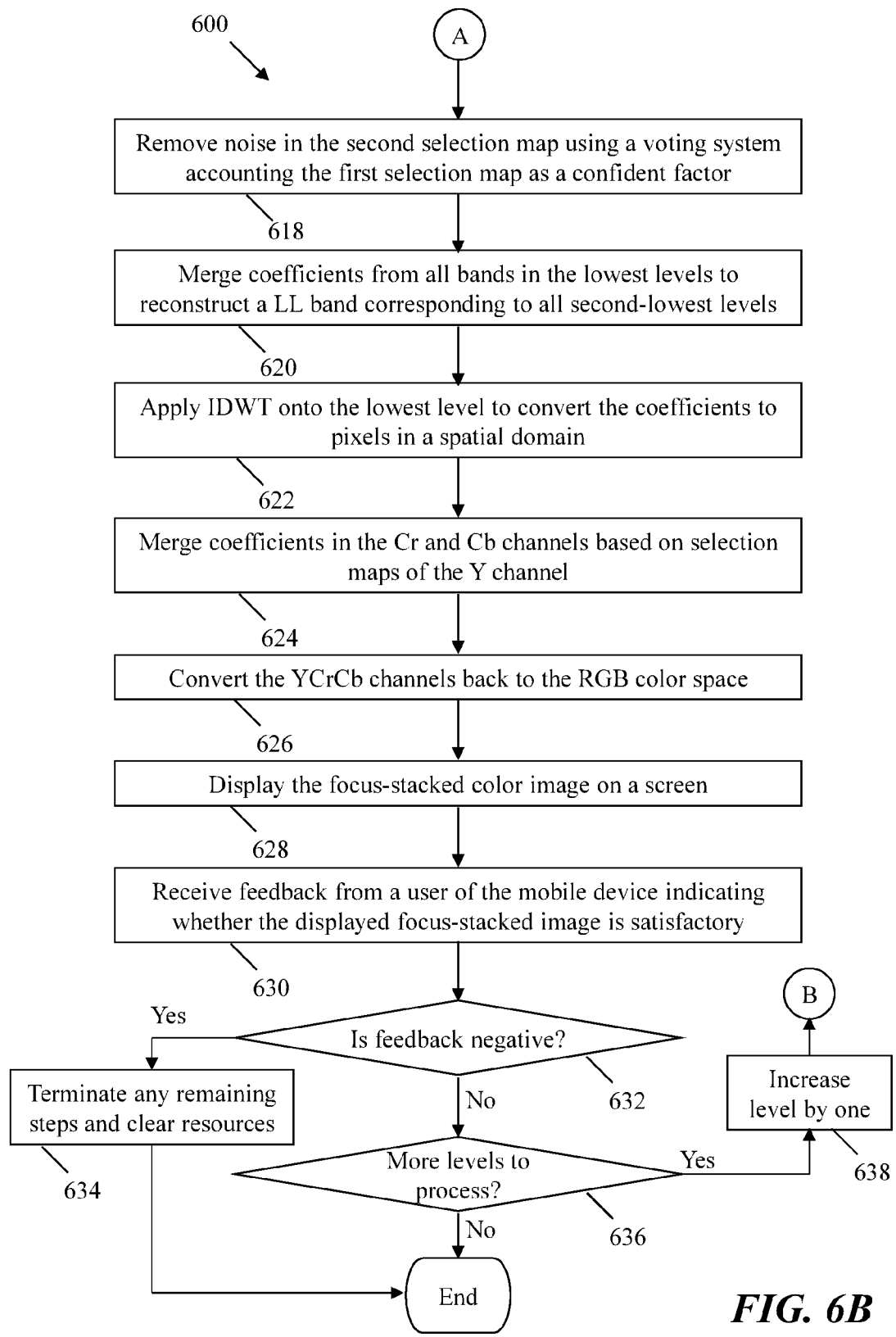

FIGS. 6A and 6B illustrate an embodiment of a focus stacking method 600, which may be implemented by a mobile device as part of the image stacking method 200. Image registration may have been completed before execution of the method 600. The method 600 may be considered detailed steps to merge a plurality of images each having a distinct or distinguished focus position in a scene to generate a focus-stacked image that encompasses all focus positions of the plurality of images.

The method 600 may start in step 602, where a plurality of aligned images may be transformed from a RGB color space to a YCbCr color space. Next, in step 604, each of the aligned images may be decomposed via DWT to generate a plurality of pyramidal structures each having an equal number of levels. For each of the plurality of aligned images, each level has four frequency bands (i.e., LL, LH, HL, and HH), and the four bands of a first level in the pyramidal structures represents the LL band of a second level immediately above the first level in the pyramidal structures. Note that the first level is not necessarily a lowest level, and the second level is not necessarily a highest level. Each of the pyramidal structures comprises a lowest level, wherein each band of each lowest level comprises a multiplicity of coefficients. For example, if each band has a size of A×B, the number of coefficients in each band may equal A×B. Moreover, note that similar to the image pyramids in the image registration stage, the plurality of pyramidal structures may be considered as one pyramidal structure, but with each level comprising bands from all images.

In step 606, a complexity of each coefficient in the LL band of each lowest level may be computed to generate a plurality of complexities. For each of A×B coefficient positions in the LL band, if K denotes a number of the images to be focus stacked, a number of computed complexities may equal K. As described previously, computing the complexity of a coefficient may comprise computing a sum of squares of coefficient differences in a window (e.g., 5×5) centered around the coefficient, e.g., using equations (1)-(3). In step 608, the K complexities may be compared to determine a maximal complexity for each coefficient position. In step 610, the method 600 may generate a first selection map for the plurality of LL bands in the lowest levels based on the maximal complexity for each position. Note that only one map (i.e., the first selection map) may be generated for all LL bands on the lowest levels. As described previously, each of the plurality of images is identifiable by an image index, thus the first selection map comprises a multiplicity of image indexes (e.g., A×B indexes) with one image index at each map position, wherein each of the image indexes in the first selection map corresponds to one of the plurality of images that leads to the maximal complexity for a position.

In step 612, any potential noise in the first selection map may be removed using a voting system in windows of a pre-set size (e.g., 5×5). In an embodiment, removing noise in the first selection map using the voting system comprises computing a number of times each image index appears in a window centered around a coefficient, and if an image index appears more than a pre-set number of times, modify the first selection map to have the image index at the position of the coefficient. The pre-set number may equal half or two-thirds of a number of coefficients contained in the window.

In step 614, complexities of coefficients in the LH, HL, and HH bands on the lowest level may be computed. Specifically, the method 600 may compute a second complexity for each coefficient in the LH, HL, and HH bands of each lowest level to generate a second plurality of complexities for each position. The method 600 may compare the second plurality of complexities to determine a second maximal complexity for each position in the LH, HL, and HH bands. In step 616, the method 600 may generate a second selection map for the plurality of LH, HL, and HH bands of the lowest levels jointly based on the second maximal complexities in the LH, HL, and HH bands. Note that only one map (i.e., the second selection map) may be generated for all high bands on each level.

In step 618, any potential noise in the second selection map may be removed using a voting system, which takes into account the first selection map as a confident factor as described above. In other words, generating the second selection map may be further based on image indexes contained in the first selection map. The pyramidal structures further comprise a plurality of second-lowest levels immediately above the lowest levels. In step 620, the method 600 may merge coefficients from all frequency bands in the lowest levels according to the first and second selection maps to reconstruct a full-band lowest level sub-image, which is also a LL band for the plurality of second-lowest levels.

In step 622, IDWT may be applied onto the lowest level to convert the coefficients to pixels in a spatial domain. Note that these pixels are for the Y channels of the original color images. In step 624, coefficients in the Cr and Cb channels may be merged based on information obtained in the Y channels. Specifically, the first and second selection maps may be directly used to select coefficients from candidate Cr and Cb images on the same level. In step 626, the YCrCb channels may be converted back to the RGB color space, forming a focus-stacking color image. In step 628, the focus-stacked image in RGB space may be displayed on a screen of the mobile device.

In step 630, the method 600 may receive feedback from a user of the mobile device indicating whether the displayed focus-stacked image is satisfactory. In block 632, the method 600 may determine whether the feedback is negative. If the feedback is negative, the method 600 may proceed to step 634, in which any remaining steps of FS may be terminated immediately. In some embodiments, termination may simply mean ending the method 600 (i.e., skipping step 634); in others, termination may include clearing memory, cache, etc. Otherwise, if the feedback is positive, the method 600 may proceed to step 636, in which the method 600 may check whether there is any more higher levels to process. If the condition in the step 636 is met, the method 600 may proceed to step 638, where the level may increase by one, indicating that the next higher level may be processed now. Otherwise, the method 600 may end. After step 638, the method 600 may return to step 614 to compute complexities of coefficients in the high bands of the second-lowest level.

The loop algorithm may continue upward until the highest level corresponding to the original resolution has been reached. Note that in subsequent loop iterations, the lowest levels and second-lowest levels should be changed respectively to level m and m+1, where m denotes a level index. Based on the loop algorithm, it can be seen that the coefficients of the Y, Cr, and Cb channels are merged level-by-level, converted to focus-stacked images in the RGB color space level-by-level, and progressively displayed level-by-level on a screen. The user may provide feedback, and terminate at any time if focus stacking result proves unacceptable. Due to time sensitivity of mobile devices, sometimes the algorithms may be designed so that all IS steps may be completed in a relatively short time span (e.g., not longer than 3 or 5 seconds).

It should be understood that any of the methods and schemes herein may be modified within the scope of this disclosure. For example, depending on the implementation, progressive display of focus-stacked images may not start until a certain size or resolution has been reached, so that the user can sufficiently judge quality of focus stacking. In this case, the lowest level and higher levels may potentially not be displayed.

Mobile devices may be designed to incorporate camera applications and user interfaces that is capable of implementing the disclosed image stacking schemes and methods. With the development of mobile industry, mobile devices have been widely used in everyday life. Compared with computers or other processor systems, mobile devices may have relatively less computation capacity, a smaller screen size, and a shorter battery life. Nevertheless, the mobility of a mobile device may enable a user of the mobile device to interact in real-time and on-site with the mobile device. For example, in using a mobile camera application, the user may set his/her preferences or requirements, e.g., regarding resolution, lighting, color, etc. On the other hand, the application may offer the user with feedbacks or suggestions regarding how to best utilize features of the mobile camera. For example, when the application detects multiple objects in a scene with multiple focus distances, the application may suggest to the user that an image stacking mode may be better. The user may respond immediately, and the application may execute the image stacking mode and display a merged or stacked image on-site without the need for any bench-based processing.

In use, image stacking in a mobile camera may be considered similar to real-time video processing. As videos are captured frame-by-frame with an interval between frames, in this disclosure images are captured one-by-one with an interval (e.g., from tens of mini-seconds to several seconds) between images. The mobile camera may require the interval before capturing another image (e.g., to charge up a camera flash, or to process the image just captured, etc.), thus the interval period may be used to perform image registration and focus stacking algorithms. Overall, a total time needed to generate a final merged image may be minimized. Further, the two stages, i.e., image registration and focus stacking, may be implemented in different orders, depending on camera features. Specifically, if an interval between two capture actions is longer than a period need to align or register two images, images may be aligned two-by-two, followed by performing focus stacking two-by-two; otherwise, image registration may be done for all captured images and focus stacking may be performed two-by-two for aligned images. Suppose that 3 images denoted as I1, I2, and I3 are captured with an interval of T1, and a time needed to align two images is T2. If T1>T2, I1 and I2 may be aligned first and then I1 and I2 may be focus stacked to generate a merged result while I3 becomes available. Otherwise, if T1<T2, I1, I2 and I3 may first be sequentially aligned or registered two-by-two, and focus stacking may be performed two-by-two for the three aligned images.

Mobile devices may often have time-sensitive features in their application. For example, a user may wish to see a final focus-stacked image shortly after capturing a plurality of original images, and the user may not wish to waste too much time waiting for the final image to display on the screen. In other words, the user may prefer a prompt on-site experience to an off-site experience (e.g., processing captured images on a bench-top computer afterwards). However, since mobile device may have a lower computation power compared to computers, it may be more difficult to process multiple captured images in a real-time or near real-time manner. From another perspective, mobile devices may usually have screen sizes smaller than computers, e.g., with smartphone displays ranging from 3.5 inches to 5.5 inches, and computer displays ranging from 10 inches to 17 inches or larger. In this case, even if full-resolution images (corresponding to the highest level) are rendered and the final image is displayed to the user, the full-resolution final image may not be fully appreciated by the user due to the limited size of mobile displays. Sometimes, mobile displays may only be capable of displaying down-sampled images. Thus, having the user to wait for completion of image stacking before capturing another image may sometimes be a waste of the limited computation power and not to the user's liking.

In an embodiment, a progressive displaying scheme may be used during image stacking. Specifically, intermediate results, such as a focus-stacked image in a low band, may be displayed to the user. Meanwhile, image stacking may proceed as usual to finish the remaining tasks. Once FS for a higher band image has been finished, the mobile display may be refreshed, and the displayed image may be replaced by the higher band image. This process may continue until FS for the highest band images is finished. This progressive displaying scheme may not noticeably increase the total computation time, while decreasing the waiting period for a user to see a focus-stacked image. The periodical refreshing of mobile display may in itself be an attractive feature to the user as well. In an embodiment, during the display of any intermediate result, if the user decides that he/she likes the FS result, the user may elect to have the remaining process to run in the background, which allows him/her to continue other applications (e.g., taking another picture). Otherwise, if the user finds the FS result unsatisfactory, he/she may immediately terminate the image stacking process, which may save the user's time as well as computation power. Afterwards, the user may take additional image(s) in either the image stacking mode or a regular mode.

As mentioned previously, a mobile camera application may be configured to offer suggestions to a user regarding when an image stacking mode is needed. In general, users of mobile devices (e.g., the general public) may have little, if any, background in image processing and relevant technologies. Consequently, a user may not know when to use an image stacking mode to capture multiple images and when to use a regular mode to capture one image. Because the image stacking mode may consume more computation resources (e.g., power, time, etc.) than the regular mode, using the regular mode may save time and battery power when the image stacking mode is unnecessary or undesirable. When using a mobile camera, a user may open a camera application, and hold a camera lens toward a scene. At this time, the camera application may analyze a preview of the scene for decision. If the application detects that there are objects at one focus distance and other objects at other focus distance(s), it indicates that one picture may be insufficient to have all objects portrayed clearly and in-focus, and that the image stacking mode may yield better result; otherwise, if the application detects that one or more objects of interest are largely at one focus distance, only one image may be necessary and the regular mode may be better. To improve user experience and help the user determine an optimal image-shooting mode, a suggestion (e.g., a message showing on the mobile display) may be given to user when the camera application senses that focus stacking may be necessary and suitable for an image scene. The user may have options either to accept the suggestion or deny the suggestion. If the image stacking mode is used, the user may then hold the mobile device still and capture a plurality of images, each of which may be in different focus positions or distances. Note that within the image stacking mode, the focus distance may be flexibly adjusted or set by the application as needed.

Although a camera application may automatically detect focus distances in an image scene, e.g., using any suitable focus sensing technique, if this capability unavailable or not preferred by a user of the camera, manual selection of objects in the scene may be used. Depending on whether the mobile device has a touch screen, the manual selection may be realized by using functions keys or the touch screen. In an embodiment, multiple touches or manual tags may be used to set focus positions for focus stacking. Specifically, after the user elects to use the image stacking mode because of either application suggestion or his/her own choice, a plurality of images will need to be captured with different focus distances. However, a mobile camera application in a mobile operating system (e.g., an ANDROID system) may sometimes only have a few pre-set focus modes, such as an auto-focus mode (which may assume focal point to be at center of the scene), a macro-focus mode (for close-up shots only), and an infinity-focus mode (for long distance objects only). Due to the limited adjustability of these focus modes, they may not be optimal to use when capturing multiple images with multiple objects, as these objects may have any arbitrary focus distance from the camera lens. In this disclosure, different objects of interest may be manually selected by a user via touches or tags. This capability may be provided in the camera application via its user interface. As the mobile application may be real-time and the mobile device may have a touch screen, the user may contact the touch screen, e.g., using a finger or a stylus, at multiple positions to choose multiple objects of interest.

Figure 7:
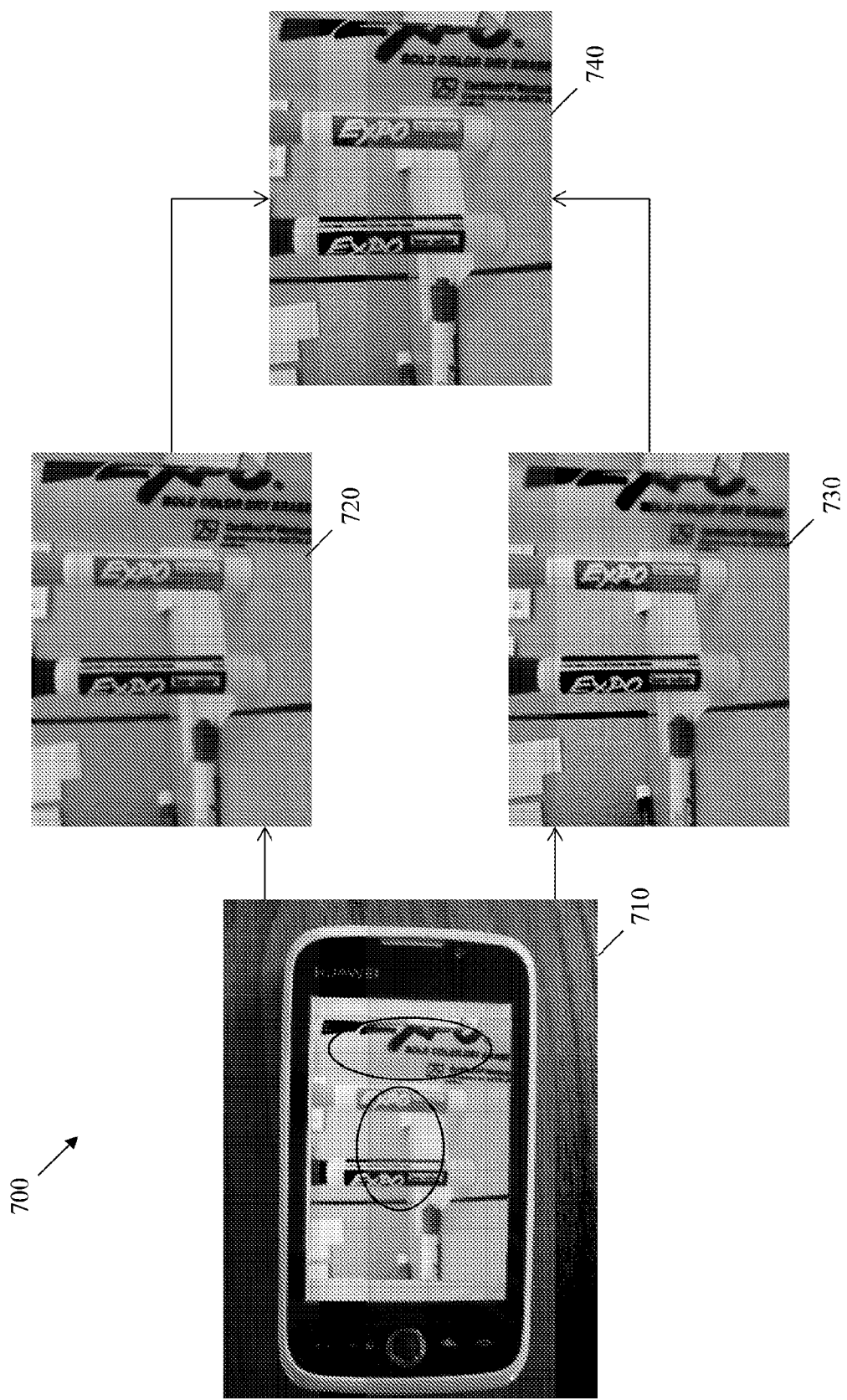
FIG. 7 illustrates an embodiment of another image stacking process.

FIG. 7 illustrates an embodiment of an image stacking process 700, in which objects of interest may be selected by manual circling. An exemplary mobile device 710 (a smartphone made by HUAWEI) is being used to capture an images of a scene, which comprises a blue marker pen in the front (with a shorter focal distance), and blue and orange marker pens in the back (with a longer focal distance). The three marker pens are the objects of interest in this scene. In this case, to capture an image of the scene using an image stacking mode, a user may first touch the screen of the mobile device 710 to set manual tags representing the objects of interest. For example, as shown in FIG. 7, selection may be made by circling a portion or the whole of each object in a preview of the scene. For the two marker pens located in the back, only one circle may be necessary, as they are roughly at the same distance. The tag setting may prove helpful since the user may not know how or be able to set focus positions, but he/she may wish to have certain objects to be clear in a final image, so he/she may leave tags by circling the objects to indicate that this object should be in focus in the final image. Note that any other selection mechanisms may also be used, such as tapping on each object of interest, or using a stylus to draw a rough boundary of each object of interest.

After selecting the objects of interest, the mobile device 710 may capture two images 720 and 730 of the same scene, since two circles were made in the preview. With tag information, the application may determine the focus distance or position of each object of interest that should be in focus. The two images 720 and 730 may be captured using different focus modes or focus distances, which have different objects clear in different images. As shown in FIG. 7, the image 720 has the front blue marker pen in focus and the image 730 has the two back marker pens in focus. Then, the two images 720 and 730 may be aligned via image registration and processed via focus stacking, resulting in a merged image 740. When merging several candidate images (e.g., the images 720 and 730) of different focus positions, based on the manual tags, the application may set high confidence on the tagged object(s) in certain images. For example, when generating the selection map of the base band and higher bands, the application may adjust the weight between different candidate images according to the tagged area or object(s). This tag-based weight adjustment method may increase a possibility to generate a correct and clearer focus-stacked image using the manual tags.

Figure 8:
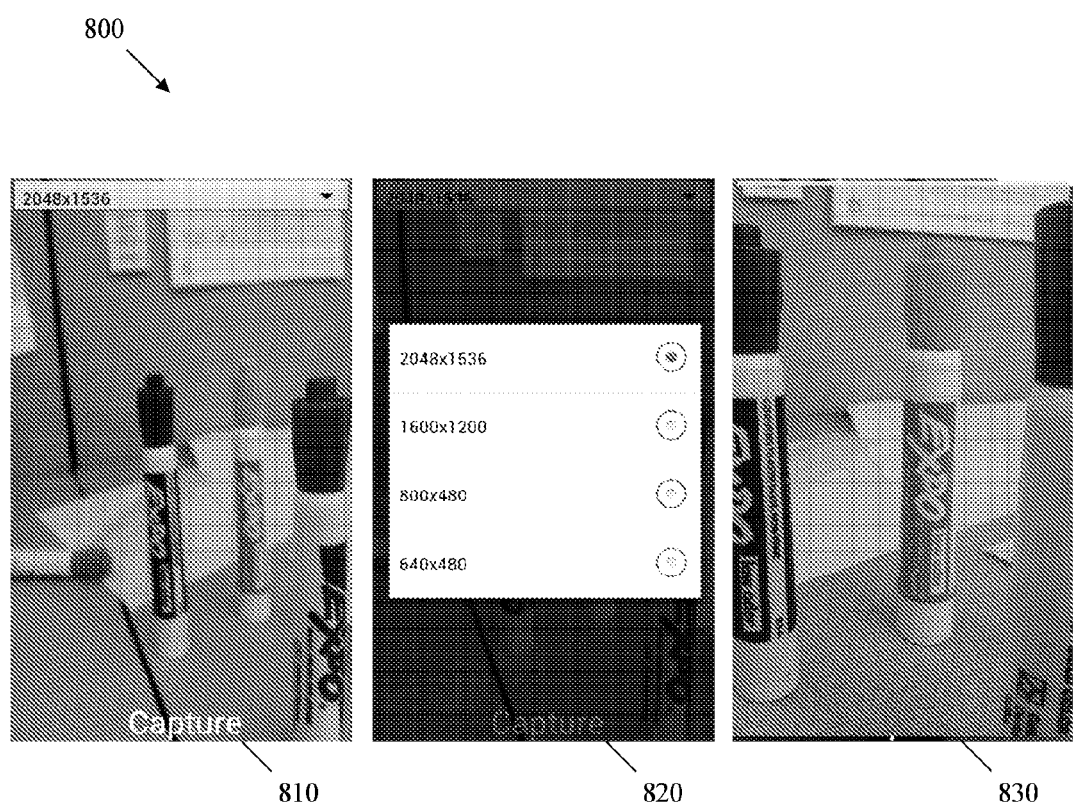
FIG. 8 illustrates an embodiment of yet another image stacking process.

The user interface of a camera application may be designed to suit a user's needs and preferences. FIG. 8 illustrates an embodiment of an image stacking process 800, in which resolution options are available to the user. The process 800 is shown using a demo application tested on a SAMSUNG GALAXY S3 smartphone. When using the application to capture in the image stacking mode, a user interface 810 (e.g., obtained by a screen snapshot) may first preview the scene. A "capture" tap or button may be available in the user interface 810. Further, a plurality of resolution classes may also be available in the user interface 810 by clicking or tapping the resolution setting. As shown in a screen snapshot 820, four resolution classes are available, which may determine the resolution of a final merged image. Generally, a higher resolution may yield a better quality of focus stacking, but may cost more computation resources and time. If the highest class is selected, as shown in the snapshot 820, multiple images (not shown in FIG. 8) may be captured, aligned, and focus-stacked. An image 830 may be generated after image registration and focus stacking. Note that the image 830 still contains uncommon areas from candidate images at its top and bottom sections, which were generated during the image registration stage. These uncommon areas will be removed from a final merged image.

As mentioned previously, local motion may be detected and dealt with during image stacking. In use, a local motion may indicate that there is one or more moving objects in the scene (e.g., a running cat, a flying airplane, etc.). As multiple images are captured in the image stacking mode, the moving objects may appear in different positions even after the images are aligned through image registration. Local motion may affect the final result of focus stacking, especially near the edges of the moving objects. There are various approaches to overcome potential issues brought by local motion. For example, a user may elect not to use the image stacking mode when there are moving objects. Alternatively, when a camera application detects local motion in a scene, it may advise the user not to use the image stacking mode. For another example, if the image stacking mode is to be used when local motion is present, the application may respond accordingly. In an embodiment, if local motion is detected, the application may try to compensate the impact of local movement. If the application is unable to detect the local motion correctly or compensate the moving objects efficiently (e.g., when local motion is beyond a pre-set range), the application may provide a feedback to the user to avoid the moving objects or to use a regular mode.

Further, disclosed image stacking schemes and methods may be used to realize or simulate effects of a high dynamic range (HDR), which is a set of techniques used in imaging and photography (e.g., in iPhone by APPLE). Compared with standard digital imaging processing methods and photographic methods, HDR may allow a greater dynamic range between the darkest and lightest areas of an image. Similar to focus stacking disclosed herein, HDR may also need a plurality of images to generate a final merged image. Different from FS disclosed herein, HDR may capture the plurality of images with different exposure levels instead of different focus distances. If FS and HDR are used separately, it may seem that if a user wishes to obtain the benefits of both HDR and FS, he/she may need to take an extra number of images. Furthermore, the combination of the HDR and FS algorithms as well as the order to process the two algorithms may affect or even degrade the final result.

To reap the benefits of both HDR and FS, FS may be implemented herein with HDR capabilities. In an embodiment, the white balance feature or technique, which may be available in some mobile cameras, may be turned on in each image to compensate for lighting conditions with different color temperatures. The mobile camera may find a reference point which represents the white color, and other points may get their colors according to the reference point. The reference point may be detected automatically or selected manually by the user. As a result of white balancing, when capturing multiple images, if the camera focuses on a bright part of the scene (by touching the screen or other aforementioned methods) in a first image, the bright part may appear clear and white-balanced, while a dark part of the scene may appear darker and sometimes even invisible (completely dark). Similarly, if the camera focuses on the dark part in a second image, the dark part may appear clear and white-balanced, while the bright part may appear over-exposed and invisible (completely white). By performing disclosed image registration and focus stacking algorithms on the white-balanced candidate images, a final merged image may comprise the bright part from the first image and the dark part from the second image. Thus, by adjusting both exposure levels and focus distances, the dynamic range of the final image may be effectively increased and the final image may appear clear, sharp, and white-balanced, which may indicate that the benefits of both FS and HDR have been obtained.

Sometimes, the contrast of the bright and dark parts may need to be adjusted for better vision measurement. Because the camera application may have access to camera information, such as exchangeable image file format (EXIF), shutter speed, aperture, and sensitivity settings (referred to as ISO), the final merged image may be further adjusted using the camera information to improve the contrast between the bright and dark parts. Specifically, using the camera information, an actual contrast between the bright and dark parts may be measured. Then, an adjustment function may be obtained for the final image to adjust its contrast. Finally, the final image may now carry the benefit of FS and HDR.

When capturing an image of multiple persons, a user may wish to portray all faces as in focus and clear. However, if the multiple faces have different distances from the camera, it may be difficult to capture an image that will portray every face as in focus. Since face detection or recognition techniques are widely available in photography, the disclosed image stacking schemes and methods may utilize face detection to automatically select objects of interest. Specifically, when the camera is capturing one image comprising multiple persons, the camera may detect the faces in the preview shown on the screen. Further, if the camera is capable of detecting distances of each face from the camera, it may determine whether FS is needed to merge all the faces. If yes, the camera (or an application operating the camera) may notify the user to use the image stacking mode. In addition, the camera may determine the number of images to capture and the focus distance of each image. Note that the number of images may not necessarily equal a number of objects of interest (in this case persons). Then, the determined number of images are captured, registered, and focus-stacked, leading to one merged image with all the faces shown in focus. In case the face detection fails, to improve the performance, the camera may also provide an option to the user to set manual tags (e.g., by touching or circling the display) to identify the objects of interest.

As a mobile camera application may be real-time or near real-time in terms of its integration with the user and its processing, camera information or parameters may be accessed and utilized by the application. Various camera parameters, such as focus mode, focus distance, distances of the objects, etc., may be useful to the image stacking mode. For example, in some cases, a camera may be able to detect a plurality of objects in the scene, and compute or measure the distance of each of the objects from the camera. Further, the camera may support different focus modes, which correspond to different focus distances. According to the object distances and focus modes, the camera may determine which focus mode to use when capturing a certain image focusing on a certain object. Note that sometimes there may be no focus mode that corresponds to a focus distance equaling an object distance, in this case, the focus mode that leads to a smallest difference between its focus distance and the object distance may be selected as an optimal mode. During image stacking, camera parameters may be used by a FS algorithm, which may be modified accordingly, e.g., to set certain objects in certain images with relatively higher confidence. The higher confidence may correspond to higher priority or weight, and this priority information may help improve the final merged image, because it may ensure that the important objects will be in focus.

Figure 9:
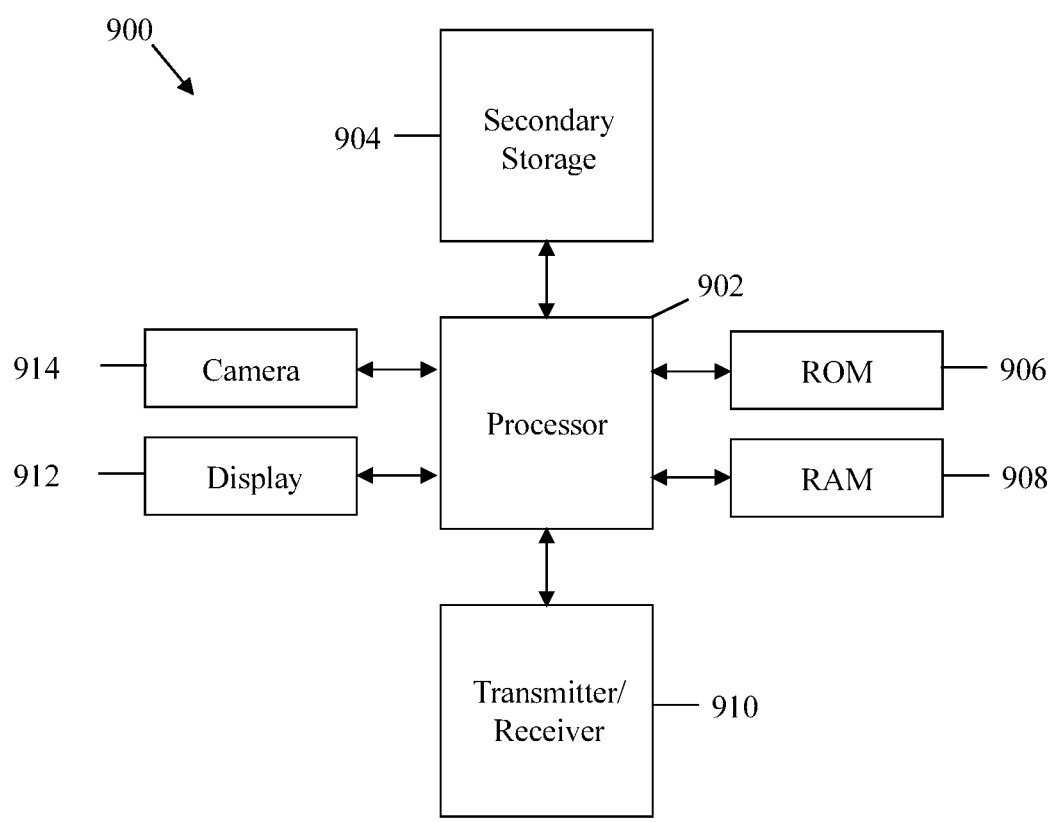
FIG. 9 illustrates a schematic diagram of a mobile computer system.

The schemes described above may be implemented on any general-purpose computer system, such as a computer or network component with sufficient processing power, memory resources, and network throughput capability to handle the necessary workload placed upon it. FIG. 9 illustrates a schematic diagram of a general-purpose mobile computer system 900 suitable for implementing one or more embodiments of the schemes and methods disclosed herein, such as the image stacking scheme 150, image stacking method 200, image registration scheme 300, image registration method 400, FS scheme 500, and FS method 600. The computer system 900 includes a processor 902 (which may be referred to as a central processor unit or CPU) that is in communication with memory devices including secondary storage 904, read only memory (ROM) 906, random access memory (RAM) 908, transmitter/receiver 910, display 912, and camera 914. Although illustrated as a single processor, the processor 902 is not so limited and may comprise multiple processors. The processor 902 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 902 may be configured to implement any of the methods, processes, and schemes described herein, such as the image stacking scheme 150, image stacking method 200, image registration scheme 300, image registration method 400, FS scheme 500, and FS method 600. The processor 902 may be implemented using hardware, software, or both.

The secondary storage 904 is typically comprised of one or more disk drives or tape drives and is used for non-volatile storage of data and as an over-flow data storage device if the RAM 908 is not large enough to hold all working data. The secondary storage 904 may be used to store programs that are loaded into the RAM 908 when such programs are selected for execution. The ROM 906 is used to store instructions and perhaps data that are read during program execution. The ROM 906 is a non-volatile memory device that typically has a small memory capacity relative to the larger memory capacity of the secondary storage 904. The RAM 908 is used to store volatile data and perhaps to store instructions. Access to both the ROM 906 and the RAM 908 is typically faster than to the secondary storage 904.

The transmitter/receiver 910 may serve as an output and/or input device of the mobile computer system 900. For example, if the transmitter/receiver 910 is acting as a transmitter, it may transmit data out of the computer system 900. If the transmitter/receiver 910 is acting as a receiver, it may receive data into the computer system 900. The transmitter/receiver 910 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices may enable the processor 902 to communicate with an Internet or one or more intranets.

The display 912 may be any type of display including, but not limited to, video monitor, liquid crystal display (LCD), touch screen display, or other type of video display for displaying video. The camera 914 may be configured to capture images and/or record videos. When capturing images, the camera 914 may be capable of adjusting its focus settings or focus distances based on objects in a scene. The mobile computer system 900 may comprise other input/output (I/O) device, such as one or more keyboards, mice, or track balls, or other well-known input devices.

It is understood that by programming and/or loading executable instructions onto the computer system 900, at least one of the processor 902, the RAM 908, and the ROM 906 are changed, transforming the computer system 900 in part into a particular machine or apparatus, e.g., a mobile device, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ..., 70 percent, 71 percent, 72 percent, ..., 95 percent, 96 percent, 97 percent, 98 percent, 99 percent, or 100 percent. Moreover, any numerical range defined by two R numbers as defined in the above is also specifically disclosed. The use of the term "about" means+10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A mobile device comprising:
a memory; and
a processor coupled to the memory, the processor configured to merge a plurality of images each having a preselected focus point in a scene to generate a focus-stacked image that encompasses all focus points of the plurality of images,
wherein merging the plurality of images comprises decomposing the plurality of images via discrete wavelet transform (DWT) to generate a plurality of pyramidal structures each having an equal number of levels, wherein for each of the plurality of images, each level has four frequency bands denoted as low-low (LL), low-high (LH), high-low (HL), and high-high (HH) bands, and wherein for each of the plurality of images, the LL, LH, HL, and HH bands of a first level in the pyramidal structures represents the LL band of a second level immediately above the first level in the pyramidal structures.

2. The mobile device of claim 1, wherein each of the plurality of pyramidal structures comprises a lowest level, wherein each band of each lowest level comprises a multiplicity of coefficients, and wherein merging the plurality of images further comprises:
computing a complexity of each coefficient in the LL band of each lowest level to generate a plurality of complexities;
comparing the plurality of complexities to determine a maximal complexity for each position; and generating a first selection map for the plurality of LL bands in the lowest levels based on the maximal complexity for each position.

3. The mobile device of claim 2, wherein computing the complexity of a coefficient comprises computing a sum of squares of coefficient differences in a window centered around the coefficient.

4. The mobile device of claim 2, wherein each of the plurality of images is identifiable by an image index, wherein the first selection map comprises a multiplicity of image indexes with one image index at each map position, and wherein each of the image indexes in the first selection map corresponds to one of the plurality of images that leads to the maximal complexity for a position.

5. The mobile device of claim 4, wherein merging the plurality of images further comprises removing noise in the first selection map by:
computing a number of times each image index appears in a window centered around a coefficient; and
modifying the first selection map to have the image index at the position of the coefficient when an image index appears more than a pre-set number of times.

6. The mobile device of claim 2, wherein merging the plurality of images further comprises:
computing a second complexity for each coefficient in the LH, HL, and HH bands of each lowest level to generate a second plurality of complexities for each position;
comparing the second plurality of complexities to determine a second maximal complexity for each position in the LH, HL, and HH bands; and
generating a second selection map for the plurality of LH, HL, and HH bands of the lowest levels jointly based on the second maximal complexities in the LH, HL, and HH bands.

7. The mobile device of claim 6, wherein computing the second complexity for a coefficient comprises computing a sum of squares of coefficients located in a window centered around the coefficient, and wherein generating the second selection map is further based on image indexes contained in the first selection map.

8. The mobile device of claim 6, wherein the plurality of pyramidal structures further comprise a plurality of second-lowest levels immediately above the lowest levels, and wherein merging the plurality of images further comprises merging coefficients from all frequency bands in the lowest levels according to the first and second selection maps to reconstruct a LL band for the plurality of second-lowest levels.

9. The mobile device of claim 8, wherein each of the plurality of pyramidal structures comprises each of a higher level above the second-lowest level, and wherein merging the plurality of images further comprises reconstructing a LL band for the plurality of higher levels based on the reconstructed LL band and the LH, HL, and HH bands of the second-lowest levels.

10. The mobile device of claim 1, wherein the processor is further configured to:
generate the plurality of images by aligning a plurality of unaligned images so that each of the plurality of images portrays a common area of the scene prior to merging the plurality of images.

11. The mobile device of claim 10, wherein aligning the plurality of unaligned images comprises:
down-sampling the plurality of unaligned images to generate an image pyramid having a number of layers; and
computing a set of motion parameters between down-sampled images on each layer, wherein computation of motion parameters on a first layer is used as initial parameters in the computation of motion parameters on a second layer immediately above the first layer,
wherein aligning the plurality of unaligned images is based on motion parameters on a highest layer.

12. The mobile device of claim 11, wherein the processor is further configured to continue aligning the plurality of unaligned images only if the set of motion parameters on all of the layers are within a pre-set threshold.

13. The mobile device of claim 11, wherein the processor is further configured to detect local motion between down-sampled images based on the set of motion parameters on a layer, and wherein merging the plurality of images is based on the local motion.

14. A method of image stacking in a mobile device comprising:
merging, using a processor, a plurality of images each having a pre-selected focus point in a scene to generate a focus-stacked image that encompasses all focus points of the plurality of images
wherein merging the plurality of images comprises decomposing the plurality of images via discrete wavelet transform (DWT) to generate a plurality of pyramidal structures each having an equal number of levels,
wherein for each of the plurality of images, each level has four frequency bands denoted as low-low (LL), low-high (LH), high-low (HL), and high-high (HH) bands, and
wherein for each of the plurality of images the LL LH HL and HH bands of a first level in the pyramidal structures represents the LL band of a second level immediately above the first level in the pyramidal structures.

15. The method of claim 14, wherein each of the plurality of pyramidal structures comprises a lowest level, wherein each band of each lowest level comprises a multiplicity of coefficients, wherein merging the plurality of images further comprises:
computing a complexity of each coefficient in the LL band of each lowest level to generate a plurality of complexities;
comparing the plurality of complexities to determine a maximal complexity for each position; and
generating a first selection map for the plurality of LL bands in the lowest levels based on the maximal complexity for each position.

16. The method of claim 15, wherein each of the plurality of images is identifiable by an image index, wherein the first selection map comprises a multiplicity of image indexes with one image index at each map position, and wherein each of the image indexes in the first selection map corresponds to one of the plurality of images that leads to the maximal complexity for a position.

17. The method of claim 16, wherein merging the plurality of images further comprises removing noise in the first selection map by:
computing a number of times each image index appears in a window centered around a coefficient; and
modifying the first selection map to have the image index at the position of the coefficient when an image index appears more than a pre-set number of times.

18. The method of claim 15, wherein merging the plurality of images further comprises:
computing a second complexity for each coefficient in the LH, HL, and HH bands of each lowest level to generate a second plurality of complexities for each position;

comparing the second plurality of complexities to determine a second maximal complexity for each position in the LH, HL, and HH bands; and generating a second selection map for the plurality of LH, HL, and HH bands of the lowest levels based on the second maximal complexities in the LH, HL, and HH bands and image indexes contained in the first selection map.

19. The method of claim 18, wherein the plurality of pyramidal structures further comprise a plurality of second-lowest levels immediately above the lowest levels and a plurality of higher levels above the second lowest levels, wherein merging the plurality of images further comprises:

merging coefficients from all frequency bands in the lowest levels according to the first and second selection maps to reconstruct a LL band for the plurality of second-lowest levels; and reconstructing a LL band for the plurality of higher levels based on the reconstructed LL band and the LH, HL, and HH bands of the second-lowest levels.

20. The method of claim 14, wherein, prior to merging the plurality of images, the method further comprises generating the plurality of images by aligning a plurality of unaligned images so that each of the plurality of images portrays a common area of the scene.

21. The method of claim 20, wherein aligning the plurality of unaligned images comprises:

down-sampling the plurality of unaligned images to generate an image pyramid having a number of layers; and computing a set of motion parameters between down-sampled images on each layer, wherein computation of motion parameters on a first layer is used as initial parameters in the computation of motion parameters on a second layer immediately above the first layer, wherein aligning the plurality of unaligned images is based on motion parameters on a highest layer.

22. The method of claim 20, further comprising continuing aligning the plurality of unaligned images only if the set of motion parameters on all of the layers are within a pre-set threshold.

23. The method of claim 20, further comprising detecting local motion between down-sampled images based on the set of motion parameters on a layer, wherein merging the plurality of images is based on the local motion.

24. An apparatus comprising:

a camera configured to capture a plurality of color images for one scene each with a distinct focus distance; and a processor coupled to the camera and configured to:
register the plurality of color images to generate a plurality of registered color images;
generate a plurality of luminance (Y) channels from the plurality of registered color images;
stack the plurality of Y channels to generate a focus-stacked Y channel;
generate a plurality of chrominance (Cr and Cb) channels from the plurality of registered color images;
stack the plurality of Cr channels based on the Y channels to generate a focus-stacked Cr channel; and
stack the plurality of Cb channels based on the Y channels to generate a focus-stacked Cb channel.

25. The apparatus of claim 24, wherein the plurality of registered color images are represented in a red, green, and blue (RGB) color space, wherein generating the plurality of Y, Cr, and Cb channels is a conversion from the RGB color space to a YCrCb color space, wherein stacking the plurality of Y, Cr, and Cb channels comprises:

decomposing each of the Y, Cr, and Cb channels to generate a number of levels comprising a first level and a second level above the first level; and merging coefficients of the Y, Cr, and Cb channels level-by-level starting from a lowest level and ending with a highest level, and wherein the processor is further configured to:
convert the merged Y, Cr, and Cb channels level-by-level to focus-stacked images in the RGB color space; and
display the focus-stacked images level-by-level on a screen of the apparatus.

26. The apparatus of claim 25, wherein the processor is further configured to:

receive feedback from a user of the apparatus indicating whether a displayed focus-stacked image is satisfactory; and continue merging the coefficients only if the feedback is positive.

27. The apparatus of claim 26, wherein the processor is further configured to perform all the aforementioned steps in a background of the apparatus such that the screen is available for the user to perform other tasks when the feedback is positive.

28. The apparatus of claim 24, wherein, prior to capturing the plurality of color images, the processor is further configured to either detect at least two objects of interest in the scene, or identify the objects of interest based on selection information provided by a user of the apparatus, wherein a number of the plurality of color images is determined by a number of the objects of interest and no greater than the number of objects of interest.

29. The apparatus of claim 28, wherein the selection information is provided via either multiple touches by the user on different positions on a screen of the apparatus or multiple tags set by the user.

30. The apparatus of claim 28, wherein, after detecting the objects of interest and prior to capturing the plurality of color images, the processor is further configured to:

provide a suggestion to a user of the apparatus to use a mode that allows adjustable focuses based on distances between the objects of interest and the camera.

31. The apparatus of claim 28, wherein the objects of interest comprises at least two human faces, and wherein the processor is further configured to detect the human faces in the scene.

32. The apparatus of claim 24, wherein registering the plurality of color images comprising computing a set of motion parameters, wherein the processor is further configured to:

continue registering the color images only if all of the motion parameters are within a pre-set threshold; and provide a suggestion to a user of the apparatus to recapture a plurality of additional color images, wherein the camera is further configured to recapture the plurality of additional color images when the suggestion is accepted by the user.

33. The apparatus of claim 24, wherein capturing the plurality of color images uses exposure levels determined by lighting conditions of objects in the scene.

* * * * *

UNITED STATES PATENT AND TRADEMARK OFFICE
CERTIFICATE OF CORRECTION

PATENT NO. : 9,047,666 B2
APPLICATION NO. : 13/795249
DATED : June 2, 2015
INVENTOR(S) : Lulin Chen, Meng Liu and Xudong Song It is certified that error appears in the above-identified patent and that said Letters Patent is hereby corrected as shown below:

In the Claims

Column 24, Lines 21 and 30, Claim 14 should read:

A method of image stacking in a mobile device comprising:
merging, using a processor, a plurality of images each having a pre-selected focus point in a scene to generate a focus-stacked image that encompasses all focus points of the plurality of images,
 wherein merging the plurality of images comprises decomposing the plurality of images via discrete wavelet transform (DWT) to generate a plurality of pyramidal structures each having an equal number of levels,
 wherein for each of the plurality of images, each level has four frequency bands denoted as low-low (LL), low-high (LH), high-low (HL), and high-high (HH) bands, and
wherein for each of the plurality of images, the LL, LH, HL, and HH bands of a first level in the pyramidal structures represents the LL band of a second level immediately above the first level in the pyramidal structures.

Signed and Sealed this
Ninth Day of February, 2016

Michelle K. Lee
*Director of the United States Patent and Trademark Office*